US008349764B2

(12) United States Patent
Burba, III

(10) Patent No.: US 8,349,764 B2
(45) Date of Patent: Jan. 8, 2013

(54) COMPOSITION FOR TREATING A FLUID

(75) Inventor: John L. Burba, III, Parker, CO (US)

(73) Assignee: Molycorp Minerals, LLC, Greenwood Village, CO (US)

( * ) Notice: Subject to any disclaimer, the term of this patent is extended or adjusted under 35 U.S.C. 154(b) by 792 days.

(21) Appl. No.: 11/932,702

(22) Filed: Oct. 31, 2007

(65) Prior Publication Data

US 2009/0111689 A1 Apr. 30, 2009

(51) Int. Cl.
B01J 20/26 (2006.01)
(52) U.S. Cl. ......................... 502/402; 502/439
(58) Field of Classification Search .................. 502/402, 502/439
See application file for complete search history.

(56) References Cited

U.S. PATENT DOCUMENTS

| | | | |
|---|---|---|---|
| 1,739,840 A | 12/1929 | Kendall |
| 2,564,241 A | 8/1951 | Warf |
| 2,567,661 A | 9/1951 | Ayres |
| 2,847,332 A | 8/1958 | Ramadanoff |
| 2,872,286 A | 2/1959 | Finzel |
| 3,194,629 A | 7/1965 | Dreibelbis et al. |
| 3,259,568 A | 7/1966 | Jordan et al. |
| 3,337,452 A | 8/1967 | Teske et al. |
| 3,347,786 A | 10/1967 | Baer et al. |
| 3,385,915 A | 5/1968 | Hamling |
| 3,575,853 A | 4/1971 | Gaughan et al. |
| 3,617,569 A | 11/1971 | Daniels et al. |
| 3,658,724 A | 4/1972 | Stiles |
| 3,692,671 A | 9/1972 | Recht et al. |
| 3,736,255 A | 5/1973 | Ghassemi et al. |
| 3,761,571 A | 9/1973 | Woodhead |
| 3,768,989 A | 10/1973 | Goetzinger et al. |
| 3,838,759 A | 10/1974 | Schmoelz et al. |
| 3,849,537 A | 11/1974 | Allgulin |
| 3,865,728 A | 2/1975 | Abbott et al. |
| 3,916,585 A | 11/1975 | Barks |
| 3,926,807 A | 12/1975 | Evers et al. |
| 3,956,118 A | 5/1976 | Kleber et al. |
| 3,965,118 A | 6/1976 | Van Rheenen |
| 4,001,375 A | 1/1977 | Longo |
| 4,046,687 A | 9/1977 | Schulze |
| 4,054,516 A | 10/1977 | Izumi et al. |
| 4,059,520 A | 11/1977 | Roller |
| 4,078,058 A | 3/1978 | Fox |
| 4,080,290 A | 3/1978 | Klantschi et al. |
| 4,088,754 A | 5/1978 | Monafo |
| 4,094,777 A | 6/1978 | Sugier et al. |
| 4,096,064 A | 6/1978 | Du Fresne |
| 4,101,631 A | 7/1978 | Ambrosini et al. |
| 4,127,644 A | 11/1978 | Norman et al. |
| 4,145,282 A | 3/1979 | Bruckenstein |
| 4,200,609 A | 4/1980 | Byrd |
| 4,230,682 A | 10/1980 | Bamberger |
| 4,231,893 A | 11/1980 | Woodhead |
| 4,251,496 A | 2/1981 | Longo et al. |
| 4,313,925 A | 2/1982 | Bamberger |
| 4,346,063 A | 8/1982 | Cahn et al. |
| 4,386,063 A | 5/1983 | Boden |
| 4,404,197 A | 9/1983 | Fox et al. |
| 4,436,655 A | 3/1984 | Masotti et al. |
| 4,474,580 A | 10/1984 | MacKenzie et al. |
| 4,474,896 A | 10/1984 | Chao |
| 4,477,315 A | 10/1984 | Tomaszewski |
| 4,498,706 A | 2/1985 | Ilardi et al. |
| 4,507,206 A | 3/1985 | Hughes |
| 4,566,975 A | 1/1986 | Allgulin |
| 4,581,229 A | 4/1986 | Petrow |
| 4,585,583 A | 4/1986 | Roberson et al. |
| 4,588,088 A | 5/1986 | Allen |
| 4,596,659 A | 6/1986 | Nomura et al. |
| 4,622,149 A | 11/1986 | Devuyst et al. |
| 4,636,289 A | 1/1987 | Mani et al. |
| 4,652,054 A | 3/1987 | Copenhafer et al. |
| 4,661,330 A | 4/1987 | Chane-Ching et al. |
| 4,714,694 A | 12/1987 | Wan et al. |
| 4,738,799 A | 4/1988 | Troy |
| 4,753,728 A | 6/1988 | VanderBilt et al. |
| 4,786,483 A | 11/1988 | Audeh |
| 4,814,152 A | 3/1989 | Tan |

(Continued)

FOREIGN PATENT DOCUMENTS

CA 2396510 2/2003

(Continued)

OTHER PUBLICATIONS

Notice of Allowance for Bangladesh Patent Application No. 286/2008, dated Nov. 11, 2009.
U.S. Appl. No. 12/721,233, filed Mar. 10, 2010, Burba et al.
U.S. Appl. No. 12/757,788, filed Apr. 9, 2010, Whitehead et al.
U.S. Appl. No. 12/725,114, filed Mar. 16, 2010, Whitehead et al.
"NanoActive Cerium Oxide," NanoScale Corporation, NA106.v.3 Apr. 1, 2008, 2 pages.
"NanoActive Granules," NanoScale Corporation, available at http://www.nanoscalecorp.com/content.php/chemicals/granules/, printed Apr. 2, 2010, 2 pages.
"NanoActive Metal Oxides," NanoScale Corporation, available at http://www.nanoscalecorp.com/content.php/chemicals/home/, printed Apr. 2, 2010, 2 pages.

(Continued)

Primary Examiner — Edward Johnson
(74) Attorney, Agent, or Firm — Sheridan Ross, P.C.

(57) ABSTRACT

An aggregate composition and process for making the aggregate composition. The aggregate composition includes an insoluble rare earth-containing compound and a polymer binder. The insoluble rare earth-containing compound can include one or more of cerium, lanthanum, or praseodymium. A suitable insoluble cerium-containing compound can be derived from cerium carbonate or a cerium salt. In a specific embodiment, the aggregate composition consists essentially of one or more cerium oxides, the polymer binder and optionally a flow aid. A process for making the composition includes mixing the insoluble rare earth-containing compound with a polymer binder to form a mixture, and subjecting the mixture to mechanical, chemical and/or thermal treatment to adhere the rare earth compound to the polymer binder. The aggregate composition can be used in a variety of fluid treatment applications to remove one or more chemical and biological contaminants in a fluid.

50 Claims, No Drawings

U.S. PATENT DOCUMENTS

| | | |
|---|---|---|
| 4,818,483 A | 4/1989 | Culling |
| 4,828,832 A | 5/1989 | De Cuellar et al. |
| 4,831,519 A | 5/1989 | Morton |
| 4,842,898 A | 6/1989 | Gradeff |
| 4,843,102 A | 6/1989 | Horton |
| 4,849,223 A | 7/1989 | Pratt |
| 4,859,432 A | 8/1989 | David et al. |
| 4,861,519 A | 8/1989 | Tusa et al. |
| 4,881,176 A | 11/1989 | Kononov |
| 4,881,976 A | 11/1989 | Gradeff |
| 4,889,771 A | 12/1989 | Gradeff et al. |
| 4,891,067 A | 1/1990 | Rappas et al. |
| 4,902,426 A | 2/1990 | Macedo et al. |
| 4,917,875 A | 4/1990 | Moore et al. |
| 4,920,195 A | 4/1990 | Kankare et al. |
| 4,935,146 A | 6/1990 | O'Neill et al. |
| 4,946,592 A | 8/1990 | Galaj et al. |
| 4,968,322 A | 11/1990 | Miyawaki et al. |
| 4,973,501 A | 11/1990 | Gradeff |
| 4,997,425 A | 3/1991 | Shioya et al. |
| 4,999,174 A | 3/1991 | Wilson et al. |
| 5,004,711 A | 4/1991 | Grodek |
| 5,013,534 A | 5/1991 | Dissaux et al. |
| 5,017,352 A | 5/1991 | Chane-Ching et al. |
| 5,024,769 A | 6/1991 | Gallup |
| 5,028,736 A | 7/1991 | Girrbach et al. |
| 5,043,072 A | 8/1991 | Hitotsuyanagi et al. |
| 5,053,139 A | 10/1991 | Dodwell et al. |
| 5,061,560 A | 10/1991 | Tajima et al. |
| 5,064,628 A | 11/1991 | Chane-Ching et al. |
| 5,066,758 A | 11/1991 | Honel et al. |
| 5,080,926 A | 1/1992 | Porter et al. |
| 5,082,570 A | 1/1992 | Higgins et al. |
| 5,104,660 A | 4/1992 | Chvapil et al. |
| 5,116,418 A | 5/1992 | Kaliski |
| 5,116,620 A | 5/1992 | Chvapil et al. |
| 5,126,116 A | 6/1992 | Krause et al. |
| 5,130,052 A | 7/1992 | Kreh et al. |
| 5,133,948 A | 7/1992 | King et al. |
| 5,145,587 A | 9/1992 | Ishii et al. |
| 5,152,936 A | 10/1992 | Tajima et al. |
| 5,161,385 A | 11/1992 | Schumacher |
| 5,178,768 A | 1/1993 | White, Jr. et al. |
| 5,192,452 A | 3/1993 | Mitsui et al. |
| 5,207,877 A | 5/1993 | Weinberg et al. |
| 5,207,995 A | 5/1993 | Bosserman |
| 5,213,779 A | 5/1993 | Kay et al. |
| 5,227,168 A | 7/1993 | Chvapil et al. |
| 5,236,595 A | 8/1993 | Wang et al. |
| 5,238,488 A | 8/1993 | Wilhelm |
| 5,248,398 A | 9/1993 | Cordani |
| 5,260,066 A | 11/1993 | Wood et al. |
| 5,281,253 A | 1/1994 | Thompson |
| 5,326,737 A | 7/1994 | Kay et al. |
| 5,328,669 A | 7/1994 | Han et al. |
| 5,330,770 A | 7/1994 | Kuno |
| 5,338,460 A | 8/1994 | Yen |
| 5,344,479 A | 9/1994 | Kerfoot et al. |
| 5,352,365 A | 10/1994 | Fuller |
| 5,356,437 A | 10/1994 | Pedersen et al. |
| 5,358,643 A | 10/1994 | Mcclintock |
| 5,368,703 A | 11/1994 | Brewster |
| 5,389,352 A | 2/1995 | Wang |
| 5,403,495 A | 4/1995 | Kust et al. |
| 5,409,522 A | 4/1995 | Durham et al. |
| 5,422,489 A | 6/1995 | Bhargava |
| 5,422,907 A | 6/1995 | Bhargava |
| 5,433,931 A | 7/1995 | Bosserman |
| 5,446,286 A | 8/1995 | Bhargava |
| 5,455,489 A | 10/1995 | Bhargava |
| 5,500,198 A | 3/1996 | Liu et al. |
| 5,505,766 A | 4/1996 | Chang |
| 5,529,811 A | 6/1996 | Sinko |
| 5,545,604 A | 8/1996 | Demmel |
| 5,551,976 A | 9/1996 | Allen |
| 5,556,545 A | 9/1996 | Volchek et al. |
| 5,575,915 A | 11/1996 | Nakamura et al. |
| 5,575,919 A | 11/1996 | Santina |
| 5,580,535 A | 12/1996 | Hoke et al. |
| 5,599,851 A | 2/1997 | Jin et al. |
| 5,603,838 A | 2/1997 | Misra et al. |
| 5,611,934 A | 3/1997 | Shepperd, III et al. |
| 5,618,406 A | 4/1997 | Demmel |
| 5,637,258 A | 6/1997 | Goldburt et al. |
| 5,649,894 A | 7/1997 | White et al. |
| 5,660,802 A | 8/1997 | Archer et al. |
| 5,683,953 A | 11/1997 | Mills |
| 5,688,378 A | 11/1997 | Khoe et al. |
| 5,689,038 A | 11/1997 | Bartram et al. |
| 5,698,212 A | 12/1997 | Hagiwara |
| 5,702,592 A | 12/1997 | Suri et al. |
| 5,711,930 A | 1/1998 | Albers et al. |
| 5,712,218 A | 1/1998 | Chopin et al. |
| 5,712,219 A | 1/1998 | Klabunde et al. |
| 5,728,404 A | 3/1998 | Von Rheinbaben et al. |
| 5,730,995 A | 3/1998 | Shirono et al. |
| 5,759,855 A | 6/1998 | Pierschbacher et al. |
| 5,759,939 A | 6/1998 | Klabunde et al. |
| 5,783,057 A | 7/1998 | Tomita et al. |
| 5,795,836 A | 8/1998 | Jin et al. |
| 5,820,966 A | 10/1998 | Krause et al. |
| 5,833,841 A | 11/1998 | Koslowsky |
| 5,859,064 A | 1/1999 | Cronce |
| 5,876,610 A | 3/1999 | Clack et al. |
| 5,897,675 A | 4/1999 | Mangold et al. |
| 5,897,781 A | 4/1999 | Dourdeville |
| 5,897,784 A | 4/1999 | Mills |
| 5,910,253 A | 6/1999 | Fuerstenau et al. |
| 5,914,287 A | 6/1999 | Saito |
| 5,914,436 A | 6/1999 | Klabunde et al. |
| 5,918,555 A | 7/1999 | Winegar |
| 5,922,926 A | 7/1999 | Back et al. |
| 5,928,504 A | 7/1999 | Hembre et al. |
| 5,938,837 A | 8/1999 | Hanawa et al. |
| 5,939,087 A | 8/1999 | Hagiwara |
| 5,952,665 A | 9/1999 | Bhargava |
| 5,976,383 A | 11/1999 | Guess et al. |
| 5,990,373 A | 11/1999 | Klabunde |
| 5,994,260 A | 11/1999 | Bonneau |
| 6,001,152 A | 12/1999 | Sinha |
| 6,001,157 A | 12/1999 | Nogami |
| 6,017,553 A | 1/2000 | Burrell et al. |
| 6,030,537 A | 2/2000 | Shaniuk et al. |
| 6,036,886 A | 3/2000 | Chhabra et al. |
| 6,045,925 A | 4/2000 | Klabunde et al. |
| 6,048,821 A | 4/2000 | Demmel et al. |
| 6,057,488 A | 5/2000 | Koper et al. |
| 6,087,294 A | 7/2000 | Klabunde et al. |
| 6,093,236 A | 7/2000 | Klabunde et al. |
| 6,093,325 A | 7/2000 | Stone |
| 6,093,328 A | 7/2000 | Santina |
| 6,099,819 A | 8/2000 | Srinivas et al. |
| 6,114,038 A | 9/2000 | Castro et al. |
| 6,123,323 A | 9/2000 | Yoneda et al. |
| 6,132,623 A | 10/2000 | Nikolaidis et al. |
| 6,136,749 A | 10/2000 | Gadkaree et al. |
| 6,143,318 A | 11/2000 | Gilchrist et al. |
| 6,146,539 A | 11/2000 | Mills |
| 6,177,015 B1 | 1/2001 | Blakey et al. |
| 6,180,016 B1 | 1/2001 | Johnston et al. |
| 6,187,192 B1 | 2/2001 | Johnston et al. |
| 6,187,205 B1 | 2/2001 | Martin et al. |
| 6,197,201 B1 | 3/2001 | Misra et al. |
| 6,197,204 B1 | 3/2001 | Heskett |
| 6,200,482 B1 | 3/2001 | Winchester et al. |
| 6,203,709 B1 | 3/2001 | Min et al. |
| 6,214,238 B1 | 4/2001 | Gallup |
| 6,221,118 B1 | 4/2001 | Yoshida et al. |
| 6,221,602 B1 | 4/2001 | Barbera-Guillem et al. |
| 6,221,903 B1 | 4/2001 | Courchesne |
| 6,224,898 B1 | 5/2001 | Balogh et al. |
| 6,238,566 B1 | 5/2001 | Yoshida et al. |
| 6,238,686 B1 | 5/2001 | Burrell et al. |
| 6,248,605 B1 | 6/2001 | Harkonen et al. |
| 6,258,334 B1 | 7/2001 | Gadkaree et al. |
| 6,264,841 B1 | 7/2001 | Tudor |
| 6,294,006 B1 | 9/2001 | Andou |

| | | |
|---|---|---|
| 6,299,851 B1 | 10/2001 | Li et al. |
| 6,300,640 B1 | 10/2001 | Bhargava et al. |
| 6,312,604 B1 | 11/2001 | Denkewicz et al. |
| 6,319,108 B1 | 11/2001 | Adefris et al. |
| 6,326,326 B1 | 12/2001 | Feng et al. |
| 6,328,779 B1 | 12/2001 | He et al. |
| 6,338,800 B1 | 1/2002 | Kulperger et al. |
| 6,341,567 B1 | 1/2002 | Robertson et al. |
| 6,342,163 B1 | 1/2002 | DeLonge et al. |
| 6,350,383 B1 | 2/2002 | Douglas |
| 6,351,932 B1 | 3/2002 | Hummel |
| 6,361,824 B1 | 3/2002 | Yekimov et al. |
| 6,368,510 B2 | 4/2002 | Friot |
| 6,372,003 B1 | 4/2002 | Kasai et al. |
| 6,375,834 B1 | 4/2002 | Guess et al. |
| 6,383,273 B1 | 5/2002 | Kepner et al. |
| 6,383,395 B1 | 5/2002 | Clarke et al. |
| 6,391,207 B1 | 5/2002 | Cluyse |
| 6,391,869 B1 | 5/2002 | Parks et al. |
| 6,395,659 B2 | 5/2002 | Seto et al. |
| 6,395,736 B1 | 5/2002 | Parks et al. |
| 6,403,653 B1 | 6/2002 | Hobson et al. |
| 6,406,676 B1 | 6/2002 | Sundkvist |
| 6,410,603 B1 | 6/2002 | Hobson et al. |
| 6,417,423 B1 | 7/2002 | Koper et al. |
| 6,420,434 B1 | 7/2002 | Braue et al. |
| 6,428,705 B1 | 8/2002 | Allen et al. |
| 6,440,300 B1 | 8/2002 | Randall et al. |
| 6,444,143 B2 | 9/2002 | Bawendi et al. |
| 6,452,184 B1 | 9/2002 | Taskar et al. |
| 6,460,535 B1 | 10/2002 | Nisewander et al. |
| 6,461,535 B1 | 10/2002 | de Esparza |
| 6,468,499 B1 | 10/2002 | Balachandran et al. |
| 6,475,451 B1 | 11/2002 | Leppin et al. |
| 6,524,487 B2 | 2/2003 | Kulperger et al. |
| 6,524,540 B1 | 2/2003 | Heinig |
| 6,528,451 B2 | 3/2003 | Brezny et al. |
| 6,536,672 B1 | 3/2003 | Outwater |
| 6,537,382 B1 | 3/2003 | Bartram et al. |
| 6,542,487 B1 | 4/2003 | Ishii et al. |
| 6,542,540 B1 | 4/2003 | Leung et al. |
| 6,551,514 B1 | 4/2003 | Misra et al. |
| 6,562,092 B1 | 5/2003 | Ito et al. |
| 6,562,403 B2 | 5/2003 | Klabunde et al. |
| 6,569,224 B2 | 5/2003 | Kerfoot et al. |
| 6,569,393 B1 | 5/2003 | Hoke et al. |
| 6,569,490 B2 | 5/2003 | Yadav et al. |
| 6,572,672 B2 | 6/2003 | Yadav et al. |
| 6,576,092 B2 | 6/2003 | Granite et al. |
| 6,585,787 B2 | 7/2003 | Yamasaki et al. |
| 6,589,496 B1 | 7/2003 | Yabe et al. |
| 6,599,428 B1 | 7/2003 | Douglas |
| 6,599,429 B1 | 7/2003 | Azizian |
| 6,602,111 B1 | 8/2003 | Fujie et al. |
| 6,602,671 B1 | 8/2003 | Bawendi et al. |
| 6,610,264 B1 | 8/2003 | Buchanan et al. |
| 6,613,230 B2 | 9/2003 | Krulik et al. |
| 6,623,642 B2 | 9/2003 | Robertson |
| 6,627,632 B2 | 9/2003 | Parks et al. |
| 6,653,519 B2 | 11/2003 | Koper et al. |
| 6,666,903 B1 | 12/2003 | Green |
| 6,680,211 B2 | 1/2004 | Barbera-Guillem et al. |
| 6,689,178 B2 | 2/2004 | Ito et al. |
| 6,706,082 B2 | 3/2004 | Ota et al. |
| 6,706,195 B2 | 3/2004 | Jensen et al. |
| 6,716,895 B1 | 4/2004 | Terry |
| 6,719,828 B1 | 4/2004 | Lovell et al. |
| 6,723,349 B1 | 4/2004 | Hill et al. |
| 6,740,141 B2 | 5/2004 | Espin et al. |
| 6,770,483 B2 | 8/2004 | Lyon |
| 6,774,361 B2 | 8/2004 | Bawendi et al. |
| 6,780,332 B2 | 8/2004 | Shiau et al. |
| 6,790,363 B2 | 9/2004 | Vempati |
| 6,790,420 B2 | 9/2004 | Breen et al. |
| 6,790,521 B1 | 9/2004 | Taketomi et al. |
| 6,800,204 B2 | 10/2004 | Harck et al. |
| 6,808,692 B2 | 10/2004 | Oehr |
| 6,821,414 B1 | 11/2004 | Johnson et al. |
| 6,821,434 B1 | 11/2004 | Moore et al. |
| 6,824,690 B1 | 11/2004 | Zhao et al. |
| 6,827,766 B2 | 12/2004 | Carnes et al. |
| 6,833,123 B2 | 12/2004 | Huang et al. |
| 6,843,617 B2 | 1/2005 | Chowdhury et al. |
| 6,843,919 B2 | 1/2005 | Klabunde et al. |
| 6,843,923 B2 | 1/2005 | Morton |
| 6,846,432 B2 | 1/2005 | Mills |
| 6,849,187 B2 | 2/2005 | Shaniuk |
| 6,852,903 B1 | 2/2005 | Brown et al. |
| 6,855,665 B1 | 2/2005 | Blake et al. |
| 6,858,147 B2 | 2/2005 | Dukhin et al. |
| 6,860,924 B2 | 3/2005 | Rajagopalan et al. |
| 6,861,002 B2 | 3/2005 | Hughes |
| 6,862,825 B1 | 3/2005 | Lowndes |
| 6,863,825 B2 | 3/2005 | Witham et al. |
| 6,864,213 B2 | 3/2005 | Labarge et al. |
| 6,881,424 B1 | 4/2005 | Kemp et al. |
| 6,881,766 B2 | 4/2005 | Hain |
| 6,883,825 B2 | 4/2005 | Schneider |
| 6,887,302 B2 | 5/2005 | Rajagopalan et al. |
| 6,887,566 B1 | 5/2005 | Hung et al. |
| 6,896,809 B2 | 5/2005 | Qian et al. |
| 6,901,684 B2 | 6/2005 | Ito et al. |
| 6,905,527 B2 | 6/2005 | Ito et al. |
| 6,905,698 B1 | 6/2005 | Aldcroft et al. |
| 6,908,560 B2 | 6/2005 | Guter |
| 6,908,570 B2 | 6/2005 | Green |
| 6,908,628 B2 | 6/2005 | Herruzo |
| 6,914,033 B2 | 7/2005 | Gislason et al. |
| 6,914,034 B2 | 7/2005 | Vo |
| 6,919,029 B2 | 7/2005 | Meng et al. |
| 6,921,739 B2 | 7/2005 | Smith et al. |
| 6,927,501 B2 | 8/2005 | Baarman et al. |
| 6,942,840 B2 | 9/2005 | Broderick |
| 6,946,076 B2 | 9/2005 | Mills |
| 6,946,578 B2 | 9/2005 | Nakano et al. |
| 6,957,743 B2 | 10/2005 | Johnston et al. |
| 6,960,329 B2 | 11/2005 | Sellakumar |
| 6,974,564 B2 | 12/2005 | Biermann et al. |
| 6,977,039 B2 | 12/2005 | Knoll et al. |
| 6,986,798 B2 | 1/2006 | Bessho et al. |
| 6,987,129 B2 | 1/2006 | Mak et al. |
| 6,998,080 B2 | 2/2006 | Stadermann et al. |
| 7,008,559 B2 | 3/2006 | Chen |
| 7,014,782 B2 | 3/2006 | D'Emidio et al. |
| 7,025,800 B2 | 4/2006 | Campbell et al. |
| 7,029,516 B2 | 4/2006 | Campbell et al. |
| 7,033,419 B1 | 4/2006 | Granite et al. |
| RE39,098 E | 5/2006 | Klabunde et al. |
| 7,037,480 B2 | 5/2006 | Bhinde |
| 7,048,853 B2 | 5/2006 | Witham et al. |
| 7,048,860 B2 | 5/2006 | Oishi |
| 7,049,382 B2 | 5/2006 | Haftka et al. |
| 7,056,454 B2 | 6/2006 | Fujino |
| 7,060,233 B1 | 6/2006 | Srinivas et al. |
| 7,067,294 B2 | 6/2006 | Singh et al. |
| 7,074,336 B1 | 7/2006 | Teter et al. |
| 7,078,071 B2 | 7/2006 | Taketomi et al. |
| 7,081,428 B1 | 7/2006 | Thampi |
| 7,083,730 B2 | 8/2006 | Davis |
| 7,094,383 B2 | 8/2006 | Wang et al. |
| 7,101,415 B2 | 9/2006 | Torres et al. |
| 7,101,493 B2 | 9/2006 | Colucci |
| 7,112,237 B2 | 9/2006 | Zeller et al. |
| 7,129,684 B2 | 10/2006 | Park |
| 7,141,227 B2 | 11/2006 | Chan |
| 7,156,888 B2 | 1/2007 | Mochizuki |
| 7,156,994 B1 | 1/2007 | Archer |
| 7,160,505 B2 | 1/2007 | Belbachir et al. |
| 7,179,849 B2 | 2/2007 | Terry |
| 7,183,235 B2 | 2/2007 | Lovell et al. |
| 7,186,671 B2 | 3/2007 | Smith et al. |
| 7,192,602 B2 | 3/2007 | Fechner et al. |
| 7,211,320 B1 | 5/2007 | Cooper et |
| 7,214,836 B2 | 5/2007 | Brown et al. |
| 7,241,629 B2 | 7/2007 | Dejneka et al. |
| 7,250,174 B2 | 7/2007 | Lee et al. |
| 7,252,694 B2 | 8/2007 | Woo et al. |
| 7,252,769 B2 | 8/2007 | Dickinson |

| Patent No. | Date | Inventor |
|---|---|---|
| 7,256,049 B2 | 8/2007 | Bennett et al. |
| 7,276,640 B2 | 10/2007 | Mulukutla et al. |
| 7,279,129 B2 | 10/2007 | Lanz et al. |
| 7,282,153 B2 | 10/2007 | Barrett et al. |
| 7,291,272 B2 | 11/2007 | Bourke et al. |
| 7,291,315 B2 | 11/2007 | Obee et al. |
| 7,297,263 B2 | 11/2007 | Nelson et al. |
| 7,297,656 B2 | 11/2007 | Zhang et al. |
| 7,300,587 B2 | 11/2007 | Smith et al. |
| 7,300,589 B2 | 11/2007 | Witham et al. |
| 7,311,842 B2 | 12/2007 | Kim |
| 7,329,356 B2 | 2/2008 | Brady |
| 7,329,359 B2 | 2/2008 | Roark |
| 7,335,622 B2 | 2/2008 | Koyanaka et al. |
| 7,335,808 B2 | 2/2008 | Koper et al. |
| 7,338,603 B1 | 3/2008 | McNew et al. |
| 7,341,618 B2 | 3/2008 | Bayer et al. |
| 7,341,667 B2 | 3/2008 | Kennard et al. |
| 7,341,977 B2 | 3/2008 | Klabunde et al. |
| 7,361,279 B2 | 4/2008 | Hernandez |
| 7,368,388 B2 | 5/2008 | Small et al. |
| 7,368,412 B2 | 5/2008 | Tranter et al. |
| 7,378,372 B2 | 5/2008 | Sylvester |
| 7,422,759 B2 | 9/2008 | Kepner et al. |
| 7,429,330 B2 | 9/2008 | Vo et al. |
| 7,431,758 B2 | 10/2008 | Ota et al. |
| 7,438,828 B2 | 10/2008 | Young |
| 7,445,718 B2 | 11/2008 | Misra et al. |
| 7,459,086 B2 | 12/2008 | Gaid |
| 7,468,413 B2 | 12/2008 | Yokota et al. |
| 7,473,474 B2 | 1/2009 | Toreki et al. |
| 7,476,311 B2 | 1/2009 | Litz et al. |
| 7,481,939 B2 | 1/2009 | Haley |
| 7,498,005 B2 | 3/2009 | Yadav |
| 7,534,287 B2 | 5/2009 | Zeller et al. |
| 7,534,453 B1 | 5/2009 | Rzigalinski et al. |
| 7,560,023 B2 | 7/2009 | Miyazawa et al. |
| 7,566,393 B2 | 7/2009 | Klabunde et al. |
| 7,572,416 B2 | 8/2009 | Alward et al. |
| 7,588,744 B1 | 9/2009 | Sylvester |
| 7,588,782 B2 | 9/2009 | Moerck et al. |
| 7,591,952 B2 | 9/2009 | Young |
| 7,611,620 B2 | 11/2009 | Carson et al. |
| 7,645,540 B2 | 1/2010 | Boone et al. |
| 7,661,483 B2 | 2/2010 | Mulukutla et al. |
| 7,745,509 B2 | 6/2010 | Burton et al. |
| 7,820,100 B2 | 10/2010 | Garfield et al. |
| 2001/0009831 A1 | 7/2001 | Schink et al. |
| 2001/0012856 A1 | 8/2001 | Parks et al. |
| 2002/0003116 A1 | 1/2002 | Golden |
| 2002/0005382 A1 | 1/2002 | Kulperger et al. |
| 2002/0005383 A1 | 1/2002 | Voute et al. |
| 2002/0044901 A1 | 4/2002 | Wildon et al. |
| 2002/0066702 A1 | 6/2002 | Liu |
| 2002/0072522 A1 | 6/2002 | Parks et al. |
| 2002/0187990 A1 | 12/2002 | Parks et al. |
| 2002/0198136 A1 | 12/2002 | Mak et al. |
| 2003/0015467 A1 | 1/2003 | Johnston et al. |
| 2003/0133990 A1 | 7/2003 | Hursey et al. |
| 2003/0149406 A1 | 8/2003 | Martineau et al. |
| 2003/0156981 A1 | 8/2003 | Mills |
| 2003/0180213 A1 | 9/2003 | Carnes et al. |
| 2003/0203977 A1 | 10/2003 | Klabunde et al. |
| 2003/0207949 A1 | 11/2003 | Klabunde et al. |
| 2003/0215378 A1 | 11/2003 | Zhou et al. |
| 2004/0029715 A1 | 2/2004 | Schindler et al. |
| 2004/0031764 A1 | 2/2004 | Heinig |
| 2004/0043914 A1 | 3/2004 | Kaziska et al. |
| 2004/0050795 A1 | 3/2004 | Park et al. |
| 2004/0091417 A1 | 5/2004 | Yadav |
| 2004/0104377 A1 | 6/2004 | Phelps et al. |
| 2004/0109853 A1 | 6/2004 | McDaniel |
| 2004/0202703 A1 | 10/2004 | Meyer-Ingold et al. |
| 2004/0230086 A1 | 11/2004 | Okun et al. |
| 2005/0008861 A1 | 1/2005 | Yadav et al. |
| 2005/0058689 A1 | 3/2005 | McDaniel |
| 2005/0067347 A1 | 3/2005 | Vanhulle et al. |
| 2005/0069464 A1 | 3/2005 | Obee et al. |
| 2005/0079415 A1 | 4/2005 | Boone et al. |
| 2005/0084755 A1 | 4/2005 | Boone et al. |
| 2005/0098503 A1 | 5/2005 | Kim |
| 2005/0126338 A1 | 6/2005 | Yadav |
| 2005/0126430 A1 | 6/2005 | Lightner, Jr. et al. |
| 2005/0136486 A1 | 6/2005 | Haushalter |
| 2005/0159307 A1 | 7/2005 | Okun et al. |
| 2005/0230659 A1 | 10/2005 | Hampden-Smith et al. |
| 2005/0257724 A1 | 11/2005 | Guinther et al. |
| 2005/0271941 A1 | 12/2005 | Bushong et al. |
| 2006/0000763 A1 | 1/2006 | Rinker et al. |
| 2006/0018954 A1 | 1/2006 | Kuttler |
| 2006/0030622 A1 | 2/2006 | Mak et al. |
| 2006/0049091 A1 | 3/2006 | Cheetham et al. |
| 2006/0062831 A1 | 3/2006 | Meyer-Ingold et al. |
| 2006/0070947 A1 | 4/2006 | Conrad |
| 2006/0120930 A1 | 6/2006 | Mizukami |
| 2006/0178609 A1 | 8/2006 | Horn et al. |
| 2006/0198883 A1 | 9/2006 | Parks et al. |
| 2006/0199301 A1 | 9/2006 | Basheer et al. |
| 2006/0199733 A1 | 9/2006 | Grier et al. |
| 2006/0224237 A1 | 10/2006 | Furst et al. |
| 2006/0228275 A1 | 10/2006 | Rutman |
| 2006/0237369 A1 | 10/2006 | Kirts et al. |
| 2006/0246149 A1 | 11/2006 | Buchholz et al. |
| 2006/0254930 A1 | 11/2006 | Martinie et al. |
| 2006/0257728 A1 | 11/2006 | Mortensen et al. |
| 2006/0275564 A1 | 12/2006 | Grah et al. |
| 2007/0000836 A1 | 1/2007 | Elefritz et al. |
| 2007/0012631 A1 | 1/2007 | Coffey et al. |
| 2007/0017871 A1 | 1/2007 | Reddy et al. |
| 2007/0065491 A1 | 3/2007 | Huey et al. |
| 2007/0080115 A1 | 4/2007 | Sylvester |
| 2007/0081931 A1 | 4/2007 | Cho et al. |
| 2007/0114179 A1 | 5/2007 | Badger |
| 2007/0122327 A1 | 5/2007 | Yang et al. |
| 2007/0128424 A1 | 6/2007 | Omori et al. |
| 2007/0134307 A1 | 6/2007 | Xiao et al. |
| 2007/0142783 A1 | 6/2007 | Huey et al. |
| 2007/0149405 A1 | 6/2007 | Spitler et al. |
| 2007/0158251 A1 | 7/2007 | Chau |
| 2007/0167971 A1 | 7/2007 | Huey et al. |
| 2007/0169626 A1 | 7/2007 | Sullivan |
| 2007/0286796 A1 | 12/2007 | Koper et al. |
| 2007/0298085 A1 | 12/2007 | Lestage et al. |
| 2008/0050440 A1 | 2/2008 | Wakamura et al. |
| 2008/0058206 A1 | 3/2008 | Misra et al. |
| 2008/0058689 A1 | 3/2008 | Holloway et al. |
| 2008/0081120 A1 | 4/2008 | Van Ooij et al. |
| 2008/0090138 A1 | 4/2008 | Vu et al. |
| 2008/0093580 A1 | 4/2008 | Witham et al. |
| 2008/0097271 A1 | 4/2008 | Lo et al. |
| 2008/0102136 A1 | 5/2008 | Koper et al. |
| 2008/0125686 A1 | 5/2008 | Lo |
| 2008/0156734 A1 | 7/2008 | Burba et al. |
| 2008/0199539 A1 | 8/2008 | Baker et al. |
| 2008/0254146 A1 | 10/2008 | Huey et al. |
| 2008/0254147 A1 | 10/2008 | Huey et al. |
| 2008/0262285 A1 | 10/2008 | Black et al. |
| 2008/0264300 A1 | 10/2008 | Sato et al. |
| 2008/0302267 A1 | 12/2008 | Defalco |
| 2008/0311311 A1 | 12/2008 | Khan et al. |
| 2009/0001011 A1 | 1/2009 | Knipmeyer et al. |
| 2009/0011240 A1 | 1/2009 | Lenz et al. |
| 2009/0011930 A1 | 1/2009 | Hagemeyer |
| 2009/0012204 A1 | 1/2009 | Drechsler et al. |
| 2009/0069844 A1 | 3/2009 | Green et al. |
| 2009/0098016 A1 | 4/2009 | Koper et al. |
| 2009/0101588 A1 | 4/2009 | Misra et al. |
| 2009/0101837 A1 | 4/2009 | Kourtakis et al. |
| 2009/0107919 A1 | 4/2009 | Burba et al. |
| 2009/0107925 A1 | 4/2009 | Burba et al. |
| 2009/0108777 A1 | 4/2009 | Hyde et al. |
| 2009/0111289 A1 | 4/2009 | Vinther |
| 2009/0112043 A1 | 4/2009 | Burba et al. |
| 2009/0120802 A1 | 5/2009 | Ciampi et al. |
| 2009/0130169 A1 | 5/2009 | Bernstein |
| 2009/0206042 A1 | 8/2009 | Landau et al. |
| 2009/0264574 A1 | 10/2009 | Van Ooij et al. |
| 2009/0299253 A1 | 12/2009 | Hursey |

| | | |
|---|---|---|
| 2010/0003296 A1 | 1/2010 | Cheng et al. |
| 2010/0042206 A1 | 2/2010 | Yadav et al. |
| 2010/0055456 A1 | 3/2010 | Perera et al. |

FOREIGN PATENT DOCUMENTS

| | | |
|---|---|---|
| CN | 1248486 | 3/2000 |
| EP | 0191893 | 8/1986 |
| EP | 0541158 | 5/1993 |
| EP | 0597173 | 5/1994 |
| EP | 0812619 | 12/1997 |
| EP | 0939431 | 1/1999 |
| EP | 1201607 | 2/2002 |
| EP | 1080144 | 8/2002 |
| EP | 1452229 | 9/2004 |
| EP | 1071500 | 2/2005 |
| EP | 1870150 | 12/2007 |
| EP | 1992394 | 11/2008 |
| EP | 2161067 | 3/2010 |
| EP | 2177252 | 4/2010 |
| GB | 1447264 | 8/1976 |
| GB | 2426469 | 11/2006 |
| JP | 11/51917 | 6/1989 |
| JP | H2-17220 | 4/1990 |
| JP | 6-207561 | 7/1994 |
| JP | 10165948 | 6/1998 |
| JP | 11/090413 | 4/1999 |
| JP | 11/302684 | 11/1999 |
| JP | 11-302684 | 11/1999 |
| JP | 2000-024647 | 1/2000 |
| JP | 2000/024647 | 1/2000 |
| JP | 2002/205062 | 7/2002 |
| JP | 2002-282686 | 10/2002 |
| JP | 2002/349234 | 12/2002 |
| JP | 2004/050069 | 2/2004 |
| JP | 2004/057870 | 2/2004 |
| JP | 2004/305915 | 11/2004 |
| JP | 2004/330012 | 11/2004 |
| JP | 2005-23373 | 1/2005 |
| JP | 2005-028312 | 2/2005 |
| JP | 2005/028312 | 2/2005 |
| JP | 2005/048181 | 2/2005 |
| JP | 2005-288363 | 10/2005 |
| JP | 2005/288363 | 10/2005 |
| JP | 2006-320847 | 11/2006 |
| JP | 2006/320847 | 11/2006 |
| JP | 07/081932 | 3/2007 |
| JP | 2010-083741 | 4/2010 |
| RU | 2136607 | 9/1999 |
| RU | 2178599 | 1/2002 |
| SU | 663291 | 5/1979 |
| SU | 1766848 | 10/1992 |
| WO | WO 95/11195 | 4/1995 |
| WO | WO 97/12672 | 4/1997 |
| WO | WO 98/07493 | 2/1998 |
| WO | WO 99/28239 | 6/1999 |
| WO | WO 00/24680 | 5/2000 |
| WO | WO 01/32799 | 5/2001 |
| WO | WO 01/32820 | 5/2001 |
| WO | WO 01/78506 | 10/2001 |
| WO | WO 03/092748 | 11/2003 |
| WO | WO 2004/076770 | 9/2004 |
| WO | 2004096433 A1 | 11/2004 |
| WO | WO 2005/028707 | 3/2005 |
| WO | WO 2005/042130 | 5/2005 |
| WO | WO 2005/056175 | 6/2005 |
| WO | WO 2005/075000 | 8/2005 |
| WO | WO 2005/081722 | 9/2005 |
| WO | WO 2006/011764 | 2/2006 |
| WO | WO 2006/044784 | 4/2006 |
| WO | WO 2006/047613 | 5/2006 |
| WO | WO 2006/070153 | 7/2006 |
| WO | WO 2006/102008 | 9/2006 |
| WO | WO 2006/117424 | 11/2006 |
| WO | WO 2007/011877 | 1/2007 |
| WO | WO 2007/041553 | 4/2007 |
| WO | WO 2007/120910 | 10/2007 |
| WO | WO 2008/151173 | 12/2008 |
| WO | WO 2009/064845 | 5/2009 |
| WO | WO 2009/142823 | 11/2009 |
| WO | WO 2010/010569 | 1/2010 |
| WO | WO 2010/010570 | 1/2010 |
| WO | WO 2010/010571 | 1/2010 |
| WO | WO 2010/010574 | 1/2010 |
| WO | WO 2010/019934 | 2/2010 |

OTHER PUBLICATIONS

"NanoActive Powders," NanoScale Corporation, available at http://www.nanoscalecorp.com/content.php/chemicals/powders/, printed Apr. 2, 2010, 2 pages.

"NanoActive Suspensions," NanoScale Corporation, available at http://www.nanoscalecorp.com/content.php/chemicals/suspensions/, printed Apr. 2, 2010, 2 pages.

Australian Drinking Water Guidelines, H2O: Part V Facts Sheets, date unknown, 355 pages.

Cartwright, P.S., "A Residential Drinking Water Treatment Primer: Part 1," Water Conditioning and Purification, Feb. 2008, 6 pages.

Klabunde, K., "Overview of NanoScale: Its Technology and Capabilities," slideshow presentation by NanoScale, date unknown, 31 pages.

Pradeep, T., "Affordable clean water using nanotechnology," Indian Institute of Technology Madras, Potential Environmental Benefits of Nanotechnology: Fostering safe innovation-led growth, OECD Jul. 15-17, 2009, 58 pages.

Williams et al., "Drinking water: New disinfecting medium boosts water treatment," Filtration=Separation, Mar./Apr. 2010, pp. 16-19.

Youngran, J. et al., "Effect of competing solutes on arsenic (V) adsorption using iron and aluminum oxides," Journal of Environmental Sciences, vol. 19(8), 2007, pp. 910-919 (Abstract Only).

International Preliminary Report on Patentability for International (PCT) Patent Application No. PCT/US08/81079, mailed May 14, 2010.

U.S. Appl. No. 11/958,602, filed Dec. 18, 2007, Burba et al.
U.S. Appl. No. 11/958,644, filed Dec. 18, 2007, Burba et al.
U.S. Appl. No. 11/958,968, filed Dec. 18, 2007, Burba et al.

"Bastnasite", available at htt://webmineral.com/data/Bastnasite-(Ce).shtml, accessed Jul. 30, 2007, 6 pages.

"Carbonates", available on the Molycorp website Dec. 13, 2005, pp. 22-30.

"Cerium: A Guide to its role in Chemical Technology", Molycorp, 1992, 48 pages.

"Clear Choices for Clean Drinking Water", Consumer Reports Jan. 2003, pp. 33-37.

"Foul Release System and Drag", Proceedins of the PCE 2001 Conference, pp. 273-286, Antwerp, 12 pages.

"Homogeneous Reactions of As and Se Oxoanions in Aqueous Solutions, and the Photooxidation of their Reduced Species in the X-ray Beam", available at http://geoweb.princeton.edu/research/geochemistry/research/aqueous-oxoanion.html, accessed May 6, 2009.

"Hydrometallurgy", Hazen Research, Inc., available at http://www.hazenusa.com/hydrometallurgy-1.php, accessed Dec. 21, 2006, 7 pages.

"Potentiometry", date unknown, 14 pages.

"The Bacteriostatic Activity of Cerium, Lanthanum, and Thallium", Burkes et al., Journal of Bateriology, 54:417-24 (1947).

"UI Arsenic water treatment project shows promise", University of Idaho, Environmental News Network, Dec. 3, 2002, 2 pages.

Ahmed et al., "Arsenic Mitigation in Bangladesh", Oct. 2002, 67 pages.

Ahmed et al., "Arsenic Mitigation Technologies in South and East Asia", 44 pages, date unknown.

Ahmed, "Water Supply Options", available at http://www.physics.harvard.edu/~wilson/arsenic/conferences/Feroze_Ahmed/Sec_3 . . . , accessed May 8, 2009, 25 pages, Jan. 29, 2002.

Ahmed, M. Feroze, "An Overview of Arsenic Removal Technologies in Bangladesh and India," Buet-Unu International Workshop on Technologies for Arsenic Removal from Drinking Water, May 5-7, 2001, pp. 251-269.

Ali et al., "Fate of Arsenic in Wastes Generated from Arsenic Removal Units", Bangladesh University of Engineering and Technology, date unknown, pp. 147-159.

Amimono, "Arsenic removal by inorganic ion-exchanger", available at http://www.apec-vc.or.jp/e/modules/tinyd00/index.php?id=63&kh_open_cid_00=7, accessed May 8, 2009.

Arsenate, Wikipedia, available at http://en.wikipedia.org/w/index.php?title=Arsenate&printable=yes, accessed May 6, 2009, 2 pages.

Banu et al., "Fabrication of Diffaction-encoded micro-particles using nano-imprint lithography", J. Micromech. Microeng. 17 (2007) S116-S121.

Chambers et al., "Modern approaches to marine antifouling coatings", Surface & Coatings Technology 201 (2006) 3642-3652.

Chi et al., "Preparation of Enriched Cerium Oxide from Bastnasite with Hydrochloric Acid by Two-Step Leaching", Metallurgical and Materials Transactions B, vol. 37B, Apr. 2006-155.

ClearWater Filtration Systems, Press Release, "New Filtration Patent to Revolutionize Home Water Filtration: Arsenic Levels Can Now be Controlled".

Clifford et al., "Oxidizing Arsenic III to Arsenic V for Better Removal", Water & Wastes Digest, Water Quality Products, Mar. 2001, vol. 6, No. 3, available at http://www.wwdmag.com/Oxidizing-Arsenic-III-to-Arsenic-V-for-Better-Removal- . . . , accessed May 6, 2009, 2 pages.

Corvini et al., "Mercury Removal from Natural Gas and Liquid Streams", UOP LLC, 11 pages, date unknown.

Dejneka et al., "Rare earth-doped glass microbarcodes", PNAS, Jan. 21, 2003, vol. 100, No. 2, 389-393.

Emsley, "The Elements" Third Edition, 1998, pp. 22-23, 26-27, 54-55, 110-111.

Everett et al., "Study of the Uncatalyzed Oxidation of Arsenic(III) by Cerium(IV) in Perchloric Acid Medium", Jan. 10, 1971, Stanford University.

Fujikawa et al., "Simulteneous removal of arsenic, iron and manganese in biological treatment unit", available at http://www.apec-vc.or.jp/e/modules/tinyd00/index.php?id=65&kh_open_cid_00=7, accessed May 8, 2009, 3 pages.

Fujikawa et al., "The aim of this special edition", Kyoto University, available at http://www.apec-vc.or.jp/e/modules/tinyd00/index.php?id=61&kh_open_cid_00=7, accessed May 8, 2009.

Goldberg, "Competitive Adsorption of Arsenate and Arsenite on Oxides and Clay Minerals", Soil Sci. Soc. Am. J. 66:413-421 (2002).

Gordon, "Network Progress: An Update from the Secretariat", World Health Organization: International Network to Promote Household Water Treatment and Safe Storage, Issue 2, May 2005, 10 pages.

Granite et al., "Novel Sorbents for Mercury Removal from Flue Gas", Ind. Eng. Chem. Res. 2000, 39, 1020-1029.

Granite et al., "Sorbents for Mercury Capture from Fuel Gas with Application to Gasification Systems", Ind. Eng. Chem. Res. 2006, 45, 4844-4848.

Granite et al., "Techniques for Mercury Control and Measurement in Gasification Systems", Presented at the 5th International Symposium on Gas Cleaning at High Temperature, Morgantown, WV, Sep. 2002, pp. 1-5.

Harck, "Arsenic in the US", Clean Water Filtration Systems, Jan. 2002, 42 pages.

Harper et al., "Removal of arsenic from wastewater using chemical precipitation methods", Water Environment Research, vol. 64, No. 3, 200-203.

Hayes et al., "The Phase Stability of Cerium Species in Aqueous Systems", Journal of the Electrochemical Society, 149 (12) C623-C630 (2002).

Hemmila et al., "Progree in Lanthanides as Luminscent Probes", Journal of Fluorescence, vol. 15, No. 4, Jul. 2005, 529-542.

Housecroft et al., "Inorganic Chemistry", 2001, Pearson Prentice Hall, chapter 7, pp. 170-186; chapter 14, pp. 338-344; Appendix 11, pp. 752-754; chapter 24, pp. 622-640.

Jadhav, "Development and Evaluation of Nanoscale Sorbents for Mercury Capture from Warm Fuel Gas", Aug. 25, 2006, 44 pages.

Johnston et al., "Safe Water Technology for Arsenic Removal", Technologies for Arsenic Removal from Drinking Water, pp. 1-22, date unknown.

Jones et al., "Arsenic 2000: An Overview of the Arsenic Issue in Bangladesh", Water Aid Bangladesh, Dec. 2000, Pages.

Kahakachchi et al., "Extraction of arsenic species from spiked soils and standard reference materials", Analyst 2004, 129, 714-718.

Kim et al., "Carbonate Effects in the Electrochemical Oxidation of Arsenite", Electrochemical Methods for Wastewater and Potable Water Treatment, Preprints of Extended Abstracts, vol. 42, No. 2, 2002.

Lambert, Human Health and Toxicology Information Sheet for Lanthanum Concentrate (5210/5212) and Lanthanum Lantanum Chloride (5240/5241), pp. 1-8, University of California, Irvine.

Link et al., "Inorganic Nanoparticles for Transfection of Mammalian Cells and Removal of Viruses from Aqueous Solutions", Biotechnology and Bioengineering, vol. 98, No. 5, Dec. 1, 2007, 1083-1093.

Lipps et al., "Arsenic Removal from Drinking Water by Adsorptive Media", U.S. EPA Demonstration Project at Spring Brook Mobile Home Park in Wales, ME, Six-Month Evaluation Report, Sep. 2006, 12 pages.

M. Jang et al., "Remediation of Arsenic-Contaminated Solids and Washing Effluents", Chemosphere, 60, pp. 344-354, (2005).

M.G.M. Alam et al., "Chemical Extraction of Arsenic from Contaminated Soil", J. Environ Sci Health A Tox Hazard Subst Environ Eng., 41 (4), pp. 631-643 (2006 ).

M.G.M. Alam et al., "Extraction of arsenic in a synthetic arsenic-contaminated soil using phosphate", Chemosphere 43 (2001) 1035-1041.

Murcott et al., "Innovative and Sustainable Technologies to Address the Global Arsenic Crisis", Sandia National Laboratories 2005 Vendor's Forum, Albuquerque, New Mexico, Nov. 2, 2005, 85 pages.

Mushak, "Potential Impact of Acid Precipitation on Arsenic and Selenium", Environmental Health Perspectives vol. 65, pp. 105-113, 1985.

Ohashi, "Arsenic removal technology—Arsenic removal using manganese oxide", available at http://www.apec-vc.or.jp/e/modules/tinyd00/index.php?id=64&kh_open_cid_00=7, accessed May 8, 2009, 5 pages.

PURASPEC 1156 Mercury Removal, Johnson Matthey Catalysts 2003, 2 pages.

Puszynski et al., "Demonstration Project for Arsenic Removal from Drinking Water at Keystone, South Dakota", Mar. 15, 2005, 23 pages.

S.R. Al-Abed et al., "Arsenic Release from Iron Rich Mineral Processing Waste; Influence of pH and Redox Potential", Chemosphere, 66, pp. 775-782 (2007).

Shimoto, "Arsenic Removal Technology—Cerium adsorbent", available at http://www.apec-vc.or.jp/e/modules/tinyd00/index.php?id=62&kh_open_cid_00=7, accessed May 8, 2009, 4 pages.

Smith et al., "American Rare Earth Minerals: The Indispensable Resource for Clean Energy Technologies", Molycorp Minerals, LLC, Prepared for Congressional Leaders Jan. 29, 2009, 21 pages.

Stiltner, "Mercury Removal from Natural Gas and Liquid Streams", 2001, UOP LLC, 10 pages.

Tannehill, "Naturally Occurring Arsenic and Mercury" Proceedings from the Seventy-Fifth Gas Processors Association Conference, May 2007, pp. 54-55.

Thill et al., "Cytotoxicity of CeO2 Nanoparticles for *Escherichia coli*. Physico-Chemical Insight of the Cytotoxicity Mechanism", Environ. Sci. Technol. 2006, 40, 6151-6156.

Tributyltin, available at http://pmep.cce.cornell.edu/profiles/extoxnet/pyrethrins-ziram/tributyltin-ext.html, accessed Jul. 3, 2008, 6 pages.

Vu et al., "Review of Arsenic Removal Technologies for Contaminated Groundwaters", Argonne National Laboratory, Apr. 2003, 41 pages.

Wasay et al., "Adsorption of fluoride, phosphate, and arsenate ions on lanthanum-impregnated silica gel", Water Environment Research, vol. 68, No. 3 (May-Jun. 1996), pp. 295-300.

Yates et al., "Kinetics of the Iodide-catalyzed Reaction between Cerium(IV) and Arsenic(III)", Jan. 19, 1056, Yale University.

Yotsumoto et al., "Latest functions and introduction cost of water treatment technique, Water treatment technique using cerium based adsorbent and examples", Plant and Process, vol. 47, No. 8, pp. 60-63 (2005), Japan.

Yu et al., "The Phase Stability of Cerium Species in Aqueous Systems", Journal of the Electrochemical Society, 153 (1) C74-C79 (2006).

Zhang et al., "Arsenate adsorption on an Fe-Ce bimetal oxide adsorbent : Role of surface properties", Jan. 1, 2005, Institute of Research and Innovation, Japan.

Zhou et al., "Cryptography based on the absorption/emission features of multicolor semiconductor nanocrystal quantum dots", Optics Express, Jun. 28, 2004, vol. 12, No. 13, 2925-2931.

International Search Report for International (PCT) Application No. PCT/US08/81079, mailed Dec. 22, 2008.

Written Opinion for International Application (PCT) No. PCT/US08/81079, mailed Dec. 22, 2008.

Baker et al., "Present General Status of Understanding of Heteropoly Electrolytes and a Tracing of Some Major Highlights in the History of Their Elucidation", Chem. Rev., 1998, vol. 98, No. 1, pp. 3-50.

Chang, et al., "Wet air oxidation of a reactive dye solution using CoAlPO4-5 and Ce02 catalysts", Chemosphere, Aug. 2003, vol. 52, No. 6, pp. 943-949.

Coronado et al., "Polyoxometalate-based Molecular Materials", Chem. Re., 1998, vol. 98, No. 1, pp. 273-296.

Fertonani et al., "Solid State Reactions of Mercury with Pure Noble Metals Part 2 Mercury iridium system", Journal of Thermal Analysis and Calorimetry, 2002, vol. 67, pp. 403-409.

Gouzerh et al., "Main-Group Element, Organic, and Organometallic Derivatives of Polyoxometalates", Chem. Re., 1998, vol. 98, No. 1, pp. 77-112.

Hakuta et al., "Production of Ultra-fine Ceria Particles by Hydrothermal Synthesis Under Supercritical Conditions ", Journal of Materials Science Letters, 1998, vol. 17, pp. 1211-1213.

Haron et al., "Sorption removal of arsenic by cerium-exchanged zeolite P", Materials Science and Engineering B, 2008, vol. 149, pp. 204-208.

Henderson, et al., "Redox properties of water on the oxidized and reduced surfaces of CeO2(111)", Surface Science, Feb. 20, 2003, vol. 526, Nos. 1-2, pp. 1-18, Environ. Molecular Sci. Lab., Pacific Northwest Nat. Lab., Richland, WA.

Hill, "Introduction: Polyoxometalates—Multicomponent Molecular Vehicles to Probe Fundamental Issues and Practical Problems", Chem. Re., 1998, vol. 98, No. 1, pp. 1-2.

Jeannin, "The Nomenclature of Polyoxometalates: How to Connect a Name and a Structure", Chem. Rev., 1998, vol. 98, No. 1, pp. 51-76.

Katsoulis, "A Survey of Applications of Polyoxometalates," Chem. Re., 1998, vol. 98, No. 1, pp. 359-388.

Klemperer et al., "Polyocoanion Chemistry Moves toward the Future: From Solids and Solutions to Surfaces," Chem. Re., 1998, vol. 98, No. 1, pp. 297-306.

Kozhevnikov, "Catalysis by Heteropoly Acids and Multicomponent Polyoxometalates in Liquid-Phase Reactions", Chem. Re., 1998, vol. 98, No. 1, pp. 171-198.

Lin, et al."Catalytic wet air oxidation of phenol by various CeO2 catalysts", Water Research, 2002, vol. 36, pp. 3009-3014.

Liu, et al. "Effect of CeO2 doping on catalytic activity of Fe2O3/gamma-Al2O(3) catalyst for catalytic wet peroxide oxidation of azo dyes", J. Hazard. Mater., May 8, 2007, vol. 143, Nos. 1-2, pp. 448-454, School of Municipal & Environmental Engineering, Harbin Institute of Technology, China.

Lopez-Anton, et al., "Retention of mercury in activated carbons in coal combustion and gasification flue gases", Fuel Processing Technology, Jun. 20, 2002, vol. 77-78, pp. 353-358.

Lowell et al., "Selection of Metal Oxides for Removing SO2 From Flue Gas", Ind. Eng. Chem. Proc. Des. Dev., 1971, vol. 10, No. 3, pp. 384-390.

Mizuno et al., "Heterogeneous Catalysis", Chem. Re., 1998, vol. 98, No. 1, pp. 199-218.

Muller et al., "Polyoxometalates: Very Large Clusters—Nanoscale Magnets", Chem. Re., 1998, vol. 98, No. 1, pp. 239-272.

Oztekin, "Recovery of Acides from Salt Forms", Desalinatio, 2007, vol. 212, pp. 62-69.

Peng et al., "Ceria nanoparticles supported on carbon nanotubes for the removal of arsenate from water", Materials Letters, 2005, vol. 59, pp. 399-403.

Portzer et al., "Development of novel sorbents for mercury control at elevated temperatures in coal-derived syngas: Results of initial screening of candidate materials", Fuel Process. Technol. 2004, vol. 85 pp. 621-630.

Rhule et al., "Polyoxometalates in Medicine," Chem. Re., 1998, vol. 98, No. 1, pp. 327-358.

Sadakane et al., "Electrochemical Properties of Polyoxometalates as Electrocatalysts", Chem. Re., 1998, vol. 98, No. 1, pp. 219-238.

Seida, et al., "Synthesis of clay-cerium hydroxide conjugates for the adsorption of Arsenic", Adsorption Science and Technology, Dec. 2005, vol. 23, No. 8, pp. 607-618.

Song, et al.,"Nlechanism of the Photocatalytic Degradation of C.I. Reactive Black 5 at pH 12.0 Using SrTiO3/CeO2 as the Catalyst", Environmental Science & Technology, 2007, vol. 41, No. 16, pp. 5846-5853, College of Biological and Environmental Engineering, China.

Song, et al., "Photocatalytic degradation of C.I. Direct Red 23 in aqueous solutions under UV irradiation using SrTiO3/CeO2 composite as the catalyst", Journal of Hazardous Materials, Apr. 15, 2008, vol. 152, No. 3, pp. 1301-1308, College of Biological and Environmental Engineering, China.

Spiro et al., J. Chem. Soc. 1965, 78-96.

Spotnitz, et al., "Mediated electrosynthesis with cerium (IV) in methanesulphonic acid", Journal of Applied Chemistry, Mar. 1990, vol. 20, No. 2, 209-215.

Trovarelli, "Cerium Dioxide : a key component in environmental catalysis", RICH MAC Magazine, La Chimica e L'Industria, Sep. 1996, vol. 78, pp. 823-829.

Weinstock, "Homogeneous-Phase Electron-Transfer Reactions of Polyoxometalates", Chem. Re., 1998, vol. 98, No. 1, pp. 113-170.

Worthington et al., "Kinetics and Analytical Applications of the Ruthenium Catalyzed Reaction between Cerium(IV) and Arsenic(II1) in Sulferic Acid Medium", Analytical Chemistry, Sep. 1970, vol. 42, No. 11, pp. 1157-1164, Purdue University.

Yamase, "Photo- and Electrochromism of Polyoxometalates and Related Materials," Chem. Re., 1998, vol. 98, No. 1, pp. 307-326.

Examination Report for Bangladesh Application No. 287/2008, dated Mar. 13, 2009.

Yang et al., "Decontamination of Chemical Warfare Agents", Chem Rev., 1992, vol. 92, pp. 1729-1743.

U.S. Appl. No. 12/814,006, filed Jun. 11, 2010, Burba, III et al.
U.S. Appl. No. 12/814,032, filed Jun. 11, 2010, Burba, III et al.
U.S. Appl. No. 12/814,049, filed Jun. 11, 2010, Burba, III et al.
U.S. Appl. No. 12/831,054, filed Jul. 6, 2010, Burba, III et al.

Cotton, "Modern inorganic chemistry," part 2, Moscow, World, 1969, pp. 202-203.

Sukharev, "Synthesis and use of specific oxyhydrate sorbents," Moscow, Energoatomizdat, 1987, pp. 75-102.

Youngran, J. et al., "Effect of competing solutes on arsenic (V) adsorption using iron and aluminum oxides," Journal of Environmental Sciences, vol. 19(8), 2007, pp. 910-919.

Firsching, "Solubility Products of the Trivalent Rare-Earth Arsenates," J. Chem. Eng. Data, 1992, vol. 37, pp. 497-499.

Firsching et al., "Solubility Products of the Trivalent Rare-Earth Phosphates," J. Chem. Eng. Data, 1991, vol. 36, pp. 93-95.

Jiang et al., "Biological nano-mineralization of Ce phosphate by *Saccharomyces cerevisiae*," Article in Press, Chemical Geology, 2010, vol. xxx, pp. xxx-xxx, 9 pages.

Nilchi et al., "Adsorption of selected ions on hydrous cerium oxide," Journal of Radioanalytical and Nuclear Chemistry, 2009, vol. 279(1), pp. 65-74.

Ho et al., "Removal of fluoride from water through ion exchange by mesoporous Ti oxohydroxide," Journal of Colloid and Interface Science, 2004, vol. 272, pp. 399-403.

Ishihara et al., "Pore size control for mesoporous titanium hydroxide prepared with mixed template molecules and its fluoride ion-exchange property," Microporous and Mesoporous Materials, 2009, vol. 122, pp. 87-92.

Official Action (English translation only) for Russian Patent Application No. 2008107341, dated Jun. 2, 2010.

Zhang, Y., Yang, M., and Huang, X., Arsenic(V) removal with a Ce(IV)-doped iron oxide adsorbent, Chemosphere 51 (2003) 945-952.

Notice of Allowance for Bangladesh Patent Application No. 233/2009, dated Nov. 22, 2009.

U.S. Appl. No. 11/793,895, filed May 9, 2008, Boen et al.
U.S. Appl. No. 12/610,569, filed Nov. 2, 2009, Witham et al.

U.S. Appl. No. 12/616,653, filed Nov. 11, 2009, Burba et al.
U.S. Appl. No. 12/632,523, filed Dec. 7, 2009, Witham et al.
Abanades et al., "Thermochemical hydrogen production from a two-step solar-driven water-splitting cycle based on cerium oxides." Solar Energy 80 (2006) 1611-1623.
Adschiri et al., "Hydrothermal Synthesis of Metal Oxide Fine Particles at Supercritical Conditions," Ind. Eng. Chem. Res. 2000, 39, 4901-4907.
Casey, "Mystery Ceramic could lead to cheaper, stronger hydrogen fuel cells," gas2.0, Oct. 12, 2009, available at http://gas2.org/2009/10/12/mystery-ceramic-could-lead-to-cheaper-stronger-solid- . . . 3 pages.
Paulenova et al., "Redox potentials and kinetics of the Ce3+/Ce4+ redox reaction and solubility of cerium sulfates in sulfuric acid solutions," Journal of Power Sources 109 (2002) 431-438.
Kozlova et al., "Overall water splitting over Pt/TiO2 catalyst with Ce3+/Ce4+ shuttle charge transfer system," International Journal of Hydrogen Energy 34 (2009) 138-146.
Kreh et al., "Selective Oxidations with Ceric Methanesulfonate and Ceric Trifluoromethanesulfonate" Tetrahedron Letters, vol. 28, No. 10, pp. 1067-1068, 1987.
Lemont et al., "Promising optimization of the CeO2/CeCl3 cycle by reductive dissolution of cerium(IV) oxide," International Journal of Hydrogen Energy 33 (2008) 7355-7360.
Romero et al., "Syntheses, Crystal Structures, and Characterization of Bismuth Phosphates," Inorg. Chem. 1994, 33, 1869-1874.
Singh et al., "Ce0.67Cr0.33O2.11: A New Low-Temperature O2 Evolution Material and H2 Generation Catalyst by Thermochemical Splitting of Water†" Chem. Matter. 2009, 7 pages.
Viricelle et al., "Transformation of cerium(III) hydroxycarbonate into ceria. Part 1—Nucleation and growth rates of ceria," J. Chem. Soc., Faraday Trans., 1995, 91, 4431-4435.
U.S. Appl. No. 12/942,847, filed Nov. 9, 2010, Lupo et al.
"Distinguishing Adsorption and Surface Precipitation of Phosphate and Arsenate on Hydrous Iron Oxides," http://www.eng.nus.edu.sg/EResnews/0206/rd/rd_1.html, accessed Jul. 25, 2010, 4 pages.
Creaser et al., "X-ray photoelectron spectroscopic study of the oxidation and reduction of a cerium(Iii) oxide/cerium foil substrate," Catalysis Letters, 1994, vol. 23, pp. 13-24.
Heckert et al., "The role of cerium redox state in the SOD mimetic activity of nanoceria," Biomaterials, Jun. 2008, vol. 29, pp. 2705-2709.
Higuchi et al., "Electronic structure of protonic conductor SrCeO$_3$ by soft-X-ray spectroscopy," Solid State Ionics, Nov. 2004, vol. 175, pp. 549-552.
Li et al., "Synergism between rare earth cerium(IV) ion and vanillin on the corrosion of steel in H$_2$SO$_4$ solution: Weight loss, electrochemical, UV—vis, FTIR, XPS, and AFM approaches," Applied Surface Science, Jun. 2008, vol. 254, pp. 5574-5586.
Mullins et al., "Electron spectroscopy of single crystal and polycrystalline cerium oxide surfaces," Surface Science, Jul. 1998, vol. 409, pp. 307-319.
Raichur et al., "Adsorption of fluoride onto mixed rare earth oxides," Separation and Purification Technology, 2001, vol. 24, pp. 121-127.
Romeo et al, "XPS Study of the Reduction of Cerium Dioxide," Surface and Interface Analysis, May 1993, vol. 20, pp. 508-512.
Sharmin, "Arsenic Removal Processes on Trial in Bangladesh," Technologies for Arsenic Removal from Drinking Water, BUET-UNU International Workshop, Dhaka, Bangladesh, May 5-7, 2001, pp. 23-30.
Tahir, Muhammad Aslam, "Project-3: Innovative Low Cost Arsenic Removal Technologies," Thesis entitled Assessment of Arsenic and other Health Significant Water Quality Parameters in Ground Water of Northern Punjab, Department of Chemistry/ Bahauddin Zakariya University Multan, 2004, pp. 92-134.
Wakita et al., "A Synthetic Study of the Solid Solutions in the Systems La$_2$(CO$_3$)$_3$·8H$_2$O—CE$_2$(CO$_3$)·H$_2$O and La(OH)CO$_3$—CE(OH)CO$_3$," Bulletin of the Chemical Society of Japan, 1979, vol. 52(2), pp. 428-432.
Yuliati et al., "Ce L[sub]III-edge XANES Study on Valence of alumina-supported cerium oxide," Photon Factory Activity Report 2004 #22 Part B, User's Report, 2005, pp. 56.
U.S. Appl. No. 13/010,609, filed Jan. 20, 2011, Burba.
Dos Santos et al., "Review paper on current technologies for decolourisation of textile wastewaters: Perspectives for Anaerobic biotechnology," Bioresource Technology, 2007, vol. 98, pp. 2369-2385.
Gupta et al., "Novel Fluoropolymer-Based Striving for," www.PCIMAG.com, Jul. 2007, pp. 70-80.
Kirk-Othmer, ed., "Colorants for Foods, Drugs, Cosmetics, and Medical Devices," Encyclopedia of Chemical Technology, Fourth Edition, vol. 6, 1998, John Wiley & Sons, pp. 892-941.
Kirk-Othmer, ed., "Dye Carriers," Encyclopedia of Chemical Technology, Fourth Edition, vol. 8, 1998, John Wiley & Sons, pp. 533-600.
"APV Engineered Coatings Kynar®," Presentation by APV Engineered Coatings, http://www.apvcoatings.com/cms/resource_library/files/8537e627f567af63/kynar_presentation_weiss_inc_fiber_board_cement_pdf_.pdf, date unknown, 30 pages
"Benchtop Granulator™," LCI Corporation Technical Bulletin TB-GR-101, 2004, http://replay.waybackmachine.org/20040518160414/http://www.lcicorp.com/granulation/Docs/benchtop_tb.pdf, 1 page.
"New Products Kynar Aquatec from Arkema Inc.," metalmag Magazine, posted May 28, 2009, 2 pages.
"Poly GoneLines," Schaner's Waste Water Products, Inc., available at http://www.struvite.com/products.html#polygone_lines, date unknown, 3 pages.
"Radial Xtruder® Model EXDCS-60," LCI Corporation Technical Bulletin, 2006, http://replay.waybackmachine.org/20060511144227/http://www.lcicorp.com/granulation/Docs/xtruder60G_%20tb.pdf, 2 pages.
"Twin Dome Extruder Model TDG-80G," LCI Corporation Technical Bulletin, 2006, http://replay.waybackmachine.org/20060511145629/http://www.lcicorp.com/granulation/Docs/tdg80_extruder_%20tb.pdf, 2 pages.
"Virus," Wikipedia the free encyclopedia, http://wn.wikipedia.org/w/index.php?title=Virus&printable=yes, last modified Mar. 16, 2009, 28 pages.
Kirk et al., "Pigments," Kirk-Othmer Encyclopedia of Chemical Technology, Fourth Edition, vol. 19, 1996, John Wiley & Sons, pp. 1-77.
Kroschwitz et al., eds., "Lanthanides," Kirk-Othmer Encyclopedia of Chemical Technology, Fourth Edition, vol. 14, 1995, John Wiley & Sons, pp. 1091-1115.
Press Release, "Arkema proudly announces a new water-based fluoropolymer platform: Kynar® Aquatec™," Arkema Inc., Jun. 26, 2006, available at http://www.arkemasalescorner.com/kynar.page.cfm?pag=985&PRR_ID=669, 1 page.
Press Release, "Kynar Aquatec® FMA Resins: Cool-Roof Coatings are Now Significantly Longer Lasting," Arkema Inc., Aug. 24, 2009, available at http://www.arkema-inc.com/index.cfm?pag=343&PRR, 1 page.
Qureshi et al., "Synthesis, Dehydration Studies, and Cation-Exchange Behavior of a New Phase of Niobium(V) Phosphate," Bull. Chem. Soc. Jpn., Oct. 1986, vol. 59, pp. 3247-3255.
Surasitani et al., "Kinetics of the Ruthenium-Catalyzed Arsenic (111)-Cerium(IV) Reaction," J. Phys. Chem., 1959, vol. 63(6), pp. 890-892.
Tu, C., "A Study of Availability of Soil Arsenic (in Chinese)" Journal of Southwest Agricultural University, Dec. 1992, vol. 14 (6), pp. 447 (includes English translation).
Yong et al., "Nitrogen and Phosphorous Removal in Municipal Wastewater Treatment Plants in China: A Review," International Journal of Chemical Engineering, accepted Apr. 26, 2010, 10 pages.
U.S. Appl. No. 13/086,247, filed Apr. 13, 2011, Hassler et al.
U.S. Appl. No. 13/159,179, filed Jun. 13, 2011, Burba et al.
U.S. Appl. No. 13/205,543, filed Oct. 8, 2011, Burba et al.
Friend-Gray, "An Appetite for Apatite: A Study of Black Apatite Adsorption Effects on Organic and Non—Organic Environmental Contaminants," INQUIRY Journal, Spring 2008, at http://www.unh.edu/inquiryjournal/08/articles/friendgray.html, 6 pages.
Magalhães, "Arsenic. An environmental problem limited by solubility," Pure Appl. Chem., 2002, vol. 74(10), pp. 1843-1850.

PhosGuard Product Description, at http://www.seachem.com/Products/product_pages/PhosGuard.html, copyright 2007-2011, 2 pages.
Product Sheet for FXPb1 Carbon Filters, Filtrex Technologies Pvt. Ltd, dated unknown, 2 pages.
Tokunaga et al., "Removal of fluoride ions from aqueous solutions by multivalent metal compounds," International Journal of Environmental Studies, 1995, vol. 48(1), pp. 17-28.
Official Action (including translation) for Mexican Patent Application No. MX/A/2010/004589, dated Jun. 8, 2011.
International Search Report for International Application No. PCT/US08/81084, mailed Dec. 23, 2008.
Written Opinion for International Application No. PCT/US09/81084, mailed Dec. 23, 2008.
International Preliminary Report on Patentability for International Application No. PCT/US09/81084, mailed May 14, 2010.
Examination Report for Bangladesh Application No. 285/2008, dated Mar. 13, 2009.
Notice of Allowance for Bangladesh Patent Application No. 225/2009, dated Nov. 22, 2009.
International Search Report for International Application No. PCT/US2008/081092, mailed Mar. 16, 2009.
Written Opinion for International Application No. PCT/US2008/081092, mailed Mar. 16, 2009.
International Preliminary Report on Patentability for International (PCT) Patent Application No. PCT/US2008/081092, mailed May 14, 2010.
Examination Report for Bangladesh Application No. 286/2008, dated Mar. 13, 2009.
Notice of Allowance for Bangladesh Patent Application No. 222/2009, dated Dec. 7, 2009.
International Search Report for International Application No. PCT/US2008/081075, mailed Mar. 9, 2009.
International Preliminary Report on Patentability for International (PCT) Patent Application No. PCT/US2008/081075, mailed May 14, 2010.
Examination Report for Bangladesh Application No. 288/2008, dated Mar. 13, 2009.
Notice of Allowance for Bangladesh Patent Application No. 221/2009, dated Dec. 7, 2009.
Official Action for U.S. Appl. No. 11/932,090, mailed Feb. 5, 2010.
Official Action for U.S. Appl. No. 11/932,090, mailed Jul. 29, 2010.
Official Action for U.S. Appl. No. 11/932,090, dated Feb. 17, 2011.
Official Action for U.S. Appl. No. 11/932,090, dated Jul. 26, 2011.
Official Action for U.S. Appl. No. 11/931,616, mailed Feb. 18, 2010.
Official Action for U.S. Appl. No. 11/931,616, mailed Jul. 30, 2010.
Official Action for U.S. Appl. No. 11/931,616, mailed Feb, 18, 2011.
Official Action for U.S. Appl. No. 11/931,616, mailed Jul. 11, 2011.
Official Action for U.S. Appl. No. 12/814,006, mailed Jun. 28, 2011.
Official Action for U.S. Appl. No. 12/814,032, mailed Jun. 24, 2011.
Official Action for U.S. Appl. No. 12/814,049, mailed Jun. 23, 2011.
Official Action for U.S. Appl. No. 11/932,543, mailed Feb. 5, 2010.
Official Action for U.S. Appl. No. 11/932,543, mailed Jul, 29, 2010.
Official Action for U.S. Appl. No. 11/932,543, mailed Feb. 17, 2011.
Official Action for U.S. Appl. No. 11/932,543, mailed Jul. 8, 2011.
Official Action (Restriction Requirement) for U.S. Appl. No. 12/721,233, mailed Apr. 6, 2011.
Official Action for U.S. Appl. No. 12/721,233, mailed Jun. 24, 2011.
Official Action (translation only) for Chinese Patent Application No. 200880123682.8, issued Sep. 8, 2011.
Extended European Search Report for European Patent Application No. 08845814.6, dated Jun. 6, 2011.
U.S. Appl. No. 13/244,092, filed Sep. 23, 2011, Hassler et al.
U.S. Appl. No. 13/244,117, filed Sep. 23, 2011, Burba et al.
Dauber, "Anaerobtechnik. Handbuch der anaeroben Behandlung von Abwasser and Schlamm," 1993, pp. 340-341 (includes translation).
Primer for Municipal Wastewater Treatment Systems, U.S. Environmental Protection Agency, EP 832-R-04-001, Sep. 2004, pp. 1-29.
Municipal Wastewater Treatment Plant Energy Baseline Study, PG&E New Construction Energy management Program, prepared by M/J Industrial Solutions, San Francisco, CA, Jun. 2003, 43 pages.
Municipal Water Treatment, compiled Jul. 26, 2011, 7 pages.
Municipal Water Treatment—> Potable Water: Adding Fluoride, compiled Jul. 26, 2011, 5 pages.
Official Action for U.S. Appl. No. 12/814,006, mailed Dec. 30, 2011.
Extended European Search Report for European Patent Application No. 08843496.4, dated Jan. 31, 2012.
Kreutzberger "Chloroformates and Carbonates." Kirk—Othmer Encyclopedia of Chemical Technology, published online Apr. 2001, vol. 6, John Wiley & Sons, pp. 290-323.
Marshall "Chlorocarbons and Chlorohydrocarbons." Kirk—Othmer Encyclopedia of Chemical Technology, published online Apr. 2003, vol. 6, John Wiley & Sons, pp. 226-253.
Meloche et al., "Solubility product relations in the rare earth hydrous hydroxides," Analytica Chimica Acta, 1959, vol. 20, pp. 415-418.
Wu et al., "Effect of pH of Medium on Hydrothermal Synthesis of Nanocrystalline Cerium(IV) Oxide Powders," Journal of the American Ceramic Society, 2002, vol. 85(10), pp. 2462-2468.
Yon et al. "Adsorption, Gas Separation." Kirk-Othmer Encyclopedia of Chemical Technology, published online Apr. 2003, vol. 1, John Wiley & Sons, pp. 617-663.
Official Action for European Patent Application No. 08843496.4, dated Feb. 17, 2012.
Official Action (including translation) for Mexican Patent Application No. MX/A/2010/004589, dated Feb. 15, 2012.
English Translation of Official Action for China Patent Application No. 200880123664.X, dated Feb. 22, 2012 2 pages.
Search Report for European Patent Application No. 08843686.0, dated Jan. 31, 2012 7 pages.
Official Action for European Patent Application No. 08843686.0, dated Feb. 17, 2012.
Search Report for European Patent Application No. 08844456.7, dated Feb. 2, 2012 7 pages.
Notice of Allowance for U.S. Appl. No. 11/932,090, dated Mar. 21, 2012.
Official Action for U.S. Appl. No. 12/721,233, mailed Mar. 15, 2012 11 pages.
Official Action for U.S. Appl. No. 12/814,032, mailed Feb. 29, 2012.
Official Action for U.S. Appl. No. 12/814,049, mailed Feb. 24, 2012.
Filtronics "NXT-2 Adsorptive media for arsenic removal," at http://www.filtronics.com/nxt2.htm, date unknown, copyright 1998, 2008, 2 pages.
English translation of Official Action for China Patent Application No. 200880123682.8, dated May 3, 2012 7 pages.

COMPOSITION FOR TREATING A FLUID

FIELD OF THE INVENTION

The invention relates generally to the field of fluid treatment, and primarily to compositions for treating solutions and gases. In its more particular aspects, the invention relates to aggregate compositions suitable for use in treating aqueous solutions and gases that contain one or more chemical and biological contaminants, and processes for making such aggregate compositions.

BACKGROUND OF THE INVENTION

The purification and filtration of water and other aqueous solutions is necessary for many applications such as the provision of safe portable drinking water, the treatment of feeds, process streams and by-products associated with various industrial processes, and the treatment and handling of municipal waste water. Known methods for purifying aqueous solutions include reverse osmosis, distillation, ion-exchange, chemical adsorption, coagulation, flocculation, and filtering or retention. Many of these purification practices can be costly, energy inefficient and require significant technical know-how and sophistication to implement on both large and small scales. As a result, many advanced fluid purification technologies have had limited application beyond municipal or industrial applications.

Biological contaminants such as bacteria and fungi can be removed from aqueous solutions through ultrafiltration, but viruses are generally too small for filtration to be an effective means of purification. Because filtration is only somewhat effective, treatment with chemical additives tends to be the method of choice to address the presence of such contaminants. Examples of chemical additives include strong oxidizing agents such as chlorine, hydrogen peroxide, ozone or quaternary amine salts, flocculating agents, and precipitation agents. However, the use of chemical additive(s) requires careful administration and monitoring of the treated solutions as well special handling, transport, and storage, rendering them more costly and less desirable for many applications. As a result, simplified means for removing biological contaminants from aqueous solutions is desired.

In addition, with the recent rise in terrorism, governments around the world have become increasingly concerned about the effects of chemical warfare agents, biological agents, industrial chemicals and other toxic materials. Because nations stockpile such materials for both industrial uses and for use as warfare agents, such contaminants represent a hazard to armed forces and civilian populations due to potential exposure through inhalation, absorption, and/or ingestion. As a result, the contamination of ground water and other sources of portable water with chemical and biological contaminants is a primary concern for the military and for municipal governments and utility districts.

Commonly known chemical warfare agents include organosulfur-based compounds such as 2,2'-Dichlorodiethyl sulfide (HD, mustard, mustard gas, S mustard or sulfur mustard), which are known as "blister" or "blistering" agents and can be lethal in high doses. Other chemical warfare agents include organophosphorus-based ("OP") compounds, such as O-ethyl S-(2-diisopropylamino) ethyl methylphosphonothiolate (VX), 2-Propyl methylphosphonofluoridate (GB or Sarin), and 3,3'-Dimethyl-2-butyl methylphosphonofluoridate (GD or Soman), which are commonly referred to as "nerve" agents because they attack the central nervous system and can cause paralysis and potentially death in a short period of time. Other chemical contaminants include certain industrial chemicals, insecticides and pesticides such as parathion, paraoxon and malathion, which can also have harmful effects.

Methods and materials for decontaminating surfaces exposed to chemical warfare agents are known in the art. Yang et al., "Decontamination of Chemical Warfare Agents", Chem. Rev. Vol. 92, pp 1729-1743 (1992). These methods and materials tend to function by chemically reacting with and/or adsorbing the chemical warfare agent, but are focused on decontaminating vehicles, equipment, personnel and other surfaces that have been exposed to the agent. Because such methods and materials are not suitable or sufficiently effective at treating chemical warfare agents in solution there remains a need for simplified means for removing and/or detoxifying a broad spectrum of chemical contaminants from aqueous solutions, including, but not limited to, nerve agents, blister agents, pesticides, insecticides and other toxic chemical agents.

Moreover, exposure to chemical and biological contaminants through inhalation is also a concern that has not been adequately addressed. Basic methods that are used to control air quality include filtration, absorption on solid sorbents, electrostatic precipitation, chemical conversion, and treatment with various forms of radiation including heat, ultraviolet light and microwave. Gas filtration methods tend to be limited by the pore size of the filters, and are generally not capable of removing many biological and chemical contaminants. The use of ultra small pore sizes tend to clog due to particulates on the filter producing excessive pressure drop across the filter that is unacceptable for many applications. Electrostatic precipitation operates by imposing a charge on particles and then removing them from a gas stream onto an oppositely charged surface such as on a collection plate. This technique is not well suited for high velocity gas streams, for fluids containing volatile chemical contaminants or for contaminants that are otherwise difficult to charge. Chemical reactions tend to be effective on only small volumes of gas and can require additional processing or handling of the gas to remove undesirable and potentially harmful reagents and byproducts that remain. Heating, although effective for removing many types of biological and chemical contaminants from gases, tends to be ineffective on higher velocity gas streams. Ultraviolet light can be effective but is difficult to implement on larger gas volumes as the light tends to be absorbed by only those contaminants in the portion of the gas stream immediately adjacent the light source.

Adsorption of gases on a sorbent can be effective particularly where the sorbent is specifically matched to the contaminant to be removed from the gas. However, where the specific nature of the contaminant is not known or where the gas stream contains a number of diverse contaminants the use of known sorbents may not adequately purify the gas. As a result, there remains a need for a composition that is capable of removing, deactivating and/or detoxifying a diverse set of biological and chemical contaminants such as bacteria, viruses, nerve agents, blister agents, pesticides insecticides and other toxic chemical agents that may be present in a variety of fluids, including both aqueous solutions and gases.

SUMMARY OF THE INVENTION

In one embodiment, the invention provides an aggregate composition for treating a fluid containing one or more contaminants. The aggregate composition includes an insoluble rare earth-containing compound and a polymer binder.

The polymer binder can be less than about 15% by weight of the composition, in some cases less than about 10% by weight, and in still other cases less than about 8% by weight of the composition. The polymer binder can include one or more polymers selected from the group consisting of thermosetting polymers, thermoplastic polymers, elastomeric polymers, cellulosic polymers and glasses. Where the polymer binder comprises an ethylene-vinyl copolymer, the insoluble rare earth-containing compound consists essentially of an anhydrous insoluble rare earth-containing compound.

The insoluble rare earth-containing compound can include any insoluble rare earth compound but can specifically include one or more of cerium, lanthanum, or praseodymium. In some embodiments, the insoluble rare earth-containing compound can include a cerium-containing compound derived from thermal decomposition of a cerium carbonate or the decomposition of a cerium oxalate. In other embodiments, the insoluble rare earth-containing compound can include a cerium-containing compound derived from precipitation of a cerium salt. In other embodiments, the insoluble rare earth-containing compound comprises a cerium oxide. In a more specific embodiment, the aggregate composition consists essentially of one or more cerium oxides, the polymer binder, and optionally, a flow aid. The insoluble rare earth-containing compound can include particulates adhered to an outer surface of the polymer binder.

The aggregate composition can comprise aggregated particulates having a mean surface area of at least about 1 $m^2/g$, in some cases at least about 5 $m^2/g$, and in still other cases, at least about 25 $m^2/g$. The aggregate composition can comprise aggregated particulates having a mean aggregate size of at least about 1 μm. The aggregate composition has an adsorption capacity for removing arsenic from an aqueous solution of at least about 50 mg/g of the aggregate composition. In some cases, the adsorption capacity of the composition for removing arsenic from an aqueous solution is at least about 60 mg/g of the aggregate composition, and in other cases, at least about 70 mg/g.

In another aspect of the invention, a process for making an aggregate composition for treating a fluid containing one or more contaminants is provided. The process includes an initial step of mixing an insoluble rare earth-containing compound with a polymer binder to form a mixture.

The mixture is subjected to one or more of a mechanical, chemical and thermal treatment to adhere the insoluble rare earth-containing compound to the polymer binder. Mechanical treatments can include compacting, compressing, pressing, mixing, extruding and applying vibration or waves to the mixture. Chemical treatments can include one or more of chemical conversion and use of an adhesive. Thermal treatments can include heating the mixture to an elevated temperature, and allowing the mixture to cool to form an aggregate composition. In some embodiments, the elevated temperature is a temperature below the melting point of the polymer binder at which the polymer binder is malleable or tacky and the insoluble rare earth-containing compound adheres to the polymer binder. In an embodiment where the insoluble rare earth-containing compound comprises particulates, the particulates can adhere to the outer surface of the polymer binder.

The insoluble rare earth-containing compound can comprise particulates that adhere to an outer surface of the polymer binder. Optionally, the process can include compressing a heated mixture of insoluble rare earth-containing compound and polymer binder.

An optional step can include reducing the size of the aggregate composition. Size reduction can be achieved by one or more of cutting, crushing, milling, and sieving the aggregate composition.

The polymer binder can be less than about 15% by weight of the composition, in some cases less than about 10% by weight, and in still other cases less than about 8% by weight of the composition. The polymer binder can include one or more polymers selected from the group consisting of thermosetting polymers, thermoplastic polymers, elastomeric polymers, cellulosic polymers and glasses. Where the polymer binder comprises an ethylene-vinyl copolymer, the insoluble rare earth-containing compound consists essentially of an anhydrous insoluble rare earth-containing compound.

The polymer binder can be a solid. In some embodiments, the polymer binder comprises one or more of fibers, particulates, aggregates of fibers and or particulates, and mixtures of the same. The insoluble rare earth-containing compound can include particulates having a mean particle size of greater than about 1 nm. The insoluble rare earth-containing compound can include any insoluble rare earth compound but can specifically include one or more of cerium, lanthanum, or praseodymium. In some embodiments, the insoluble rare earth-containing compound can include a cerium-containing compound derived from thermal decomposition of a cerium carbonate. In other embodiments, the insoluble rare earth-containing compound can include a cerium-containing compound derived from precipitation of a cerium salt. In other embodiments, the insoluble rare earth-containing compound comprises a cerium oxide. In a more specific embodiment, the aggregate composition consists essentially of one or more cerium oxides, the polymer binder, and optionally, a flow aid.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art-having the benefit of this disclosure.

It will be understood that an aggregate composition as described herein can be used to remove, deactivate and/or detoxify one or more chemical and biological contaminants in an aqueous solution or gas. Examples of solutions that can be treated with the compositions described herein include solutions in portable-water systems, in waste water treatment systems, and in feed, process or waste streams of various industrial processes, among others. Moreover, there is a need to treat gases containing such contaminants in open environments such as on the battlefield, in enclosed spaces such as within buildings or similar structures, within vehicles such as airplanes, space craft, ships or military vehicles, and wherever such contaminants may be found. The described compositions can be used to remove chemical and biological contaminants from aqueous solutions and gases having diverse volume and flow rate characteristics and can be applied in a variety of fixed, mobile and portable applications. While portions of the disclosure herein describe the removal of contaminants from water, such references are illustrative and are not to be construed as limiting.

As used herein, "one or more of" and "at least one of" when used to preface several elements or classes of elements such as X, Y and Z or $X_1$-$X_n$, $Y_1$-$Y_n$, and $Z_1$-$Z_n$, is intended to refer to a single element selected from X or Y or Z, a combination of elements selected from the same class (such as $X_1$ and $X_2$), as well as a combination of elements selected from two or more classes (such as $Y_1$ and $Z_n$).

The terminology "remove" or "removing" includes the sorption, precipitation, conversion, and killing of pathogenic and other microorganisms, such as bacteria, viruses, fungi and protozoa and of chemical contaminants that may be present in the solution or gas. The terms "deactivate" or "deactivation", "de-toxify" or "detoxification" and "neutralize" include removing a biological or chemical contaminant from a fluid or rendering it non-pathogenic or benign to humans or other animals such as for example by killing the microorganism or converting the chemical agent into a non-toxic form or species.

The terms "biological contaminant", "microbe", "microorganism", and the like include bacteria, fungi, protozoa, viruses, algae and other biological entities and pathogenic species that can be found in aqueous solutions. Specific non-limiting examples of biological contaminants can include bacteria such as *Escherichia coli, Streptococcus faecalis, Shigella* spp, *Leptospira, Legimella pneumophila, Yersinia enterocolitica, Staphylococcus aureus, Pseudornonas aeruginosa, Klebsiella terrigena, Bacillus anthracis, Vibrio cholerae* and *Salmonella typhi*, viruses such as hepatitis A, notoviruses, rotaviruses, and enteroviruses, protozoa such as *Entamoeba histolytica, Giardia, Cryptosporidium parvum* and others. Biological contaminants can also include various species such as fungi or algae that are generally non-pathogenic but which are advantageously removed. How such biological contaminants came to be present in the solution or gas, either through natural occurrence or through intentional or unintentional contamination, is non-limiting of the invention.

The term "chemical contaminant" or "chemical agent" includes known chemical warfare agents and industrial chemicals and materials such as pesticides, insecticides and fertilizers. In some embodiments, the chemical contaminant can include one or more of an organosulfur agent, an organophosphorous agent or a mixture thereof. Specific non-limiting examples of such agents include o-alkyl phosphonofluoridates, such as sarin and soman, o-alkyl phosphoramidocyanidates, such as tabun, o-alkyl, s-2-dialkyl aminoethyl alkylphosphonothiolates and corresponding alkylated or protonated salts, such as VX, mustard compounds, including 2-chloroethylchloromethylsulfide, bis(2-chloroethyl)sulfide, bis(2-chloroethylthio)methane, 1,2-bis (2-chloroethylthio)ethane, 1,3-bis(2-chloroethylthio)-n-propane, 1,4-bis(2-chloroethylthio)-n-butane, 1,5-bis(2-chloroethylthio)-n-pentane, bis(2-chloroethylthiomethyl) ether, and bis(2-chloroethylthioethyl)ether, Lewisites, including 2-chlorovinyldichloroarsine, bis(2-chlorovinyl) chloroarsine, tris(2-chlorovinyl)arsine, bis(2-chloroethyl) ethylamine, and bis(2-chloroethyl)methylamine, saxitoxin, ricin, alkyl phosphonyldifluoride, alkyl phosphonites, chlorosarin, chlorosoman, amiton, 1,1,3,3,3,-pentafluoro-2-(trifluoromethyl)-1-propene, 3-quinuclidinyl benzilate, methylphosphonyl dichloride, dimethyl methylphosphonate, dialkyl phosphoramidic dihalides, alkyl phosphoramidates, diphenyl hydroxyacetic acid, quinuclidin-3-ol, dialkyl aminoethyl-2-chlorides, dialkyl aminoethane-2-ols, dialkyl aminoethane-2-thiols, thiodiglycols, pinacolyl alcohols, phosgene, cyanogen chloride, hydrogen cyanide, chloropicrin, phosphorous oxychloride, phosphorous trichloride, phosphorus pentachloride, alkyl phosphorous oxychloride, alkyl phosphites, phosphorous trichloride, phosphorus pentachloride, alkyl phosphites, sulfur monochloride, sulfur dichloride, and thionyl chloride.

Non-limiting examples of industrial chemical and materials that may be effectively treated with the compositions described herein include materials that have anionic functional groups such as phosphates, sulfates and nitrates, and electro-negative functional groups, such as chlorides, fluorides, bromides, ethers and carbonyls. Specific non-limiting examples can include acetaldehyde, acetone, acrolein, acrylamide, acrylic acid, acrylonitrile, aldrin/dieldrin, ammonia, aniline, arsenic, atrazine, barium, benzidine, 2,3-benzofuran, beryllium, 1,1'-biphenyl, bis(2-chloroethyl)ether, bis(chloromethyl)ether, bromodichloromethane, bromoform, bromomethane, 1,3-butadiene, 1-butanol, 2-butanone, 2-butoxyethanol, butraldehyde, carbon disulfide, carbon tetrachloride, carbonyl sulfide, chlordane, chlordecone and mirex, chlorfenvinphos, chlorinated dibenzo-p-dioxins (CDDs), chlorine, chlorobenzene, chlorodibenzofurans (CDFs), chloroethane, chloroform, chloromethane, chlorophenols, chlorpyrifos, cobalt, copper, creosote, cresols, cyanide, cyclohexane, DDT, DDE, DDD, DEHP, di(2-ethylhexyl)phthalate, diazinon, dibromochloropropane, 1,2-dibromoethane, 1,4-dichlorobenzene, 3,3'-dichlorobenzidine, 1,1-dichloroethane, 1,2-dichloroethane, 1,1-dichloroethene, 1,2-dichloroethene, 1,2-dichloropropane, 1,3-dichloropropene, dichlorvos, diethyl phthalate, diisopropyl methylphosphonate, di-n-butylphtalate, dimethoate, 1,3-dinitrobenzene, dinitrocresols, dinitrophenols, 2,4- and 2,6-dinitrotoluene, 1,2-diphenylhydrazine, di-n-octylphthalate (DNOP), 1,4-dioxane, dioxins, disulfoton, endosulfan, endrin, ethion, ethylbenzene, ethylene oxide, ethylene glycol, ethylparathion, fenthions, fluorides, formaldehyde, freon 113, heptachlor and heptachlor epoxide, hexachlorobenzene, hexachlorobutadiene, hexachlorocyclohexane, hexachlorocyclopentadiene, hexachloroethane, hexamethylene diisocyanate, hexane, 2-hexanone, HMX (octogen), hydraulic fluids, hydrazines, hydrogen sulfide, iodine, isophorone, malathion, MBOCA, methamidophos, methanol, methoxychlor, 2-methoxyethanol, methyl ethyl ketone, methyl isobutyl ketone, methyl mercaptan, methylparathion, methyl t-butyl ether, methylchloroform, methylene chloride, methylenedianiline, methyl methacrylate, methyl-tert-butyl ether, mirex and chlordecone, monocrotophos, N-nitrosodimethylamine, N-nitrosodiphenyl amine, N-nitrosodi-n-propylamine, naphthalene, nitrobenzene, nitrophenols, perchloroethylene, pentachlorophenol, phenol, phosphamidon, phosphorus, polybrominated biphenyls (PBBs), polychlorinated biphenyls (PCBs), polycyclic aromatic hydrocarbons (PAHs), propylene glycol, phthalic anhydride, pyrethrins and pyrethroids, pyridine, RDX (cyclonite), selenium, styrene, sulfur dioxide, sulfur trioxide, sulfuric acid, 1,1,2,2-tetrachloroethane, tetrachloroethylene, tetryl, thallium, tetrachloride, trichlorobenzene, 1,1,1-trichloroethane, 1,1,2-trichloroethane, trichloroethylene (TCE), 1,2,3-trichloropropane, 1,2,4-trimethylbenzene, 1,3,5-trinitrobenzene, 2,4,6-trinitrotoluene (TNT), vinyl acetate, and vinyl chloride.

In one embodiment of the invention, an aggregate composition is provided for treating a fluid containing one or more chemical and biological contaminants. The aggregate composition comprises an insoluble rare earth-containing compound and a polymer binder.

As used herein, "insoluble" is intended to refer to materials that are insoluble in water, or at most, are sparingly soluble in water under standard conditions of temperature and pressure.

The composition can comprise less than or more than 10.01% by weight of the insoluble rare earth-containing compound. The insoluble rare earth-containing compound can constitute more than about 11%, more than about 12% or more than about 15% by weight of the aggregate composition. In some cases, a higher concentration of rare earth-containing compounds may be desired. Depending on the application and the nature of other components in the composition, the composition can be at % least about 20%, in other cases at least about 50%, in still others at least about 75%, and in yet still others more than 95%, by weight of an insoluble rare earth-containing compound.

The insoluble rare earth-containing compound can include one or more of the rear earths including lanthanum, cerium, praseodymium, neodymium, promethium, samarium, europium, gadolinium, terbium, dysprosium, holmium erbium, thulium, ytterbium and lutetium. In some embodiments, the insoluble rare-earth containing compound can comprise one or more of cerium, lanthanum, or praseodymium. Insoluble rare earth-containing compounds are available commercially and may be obtained from any source or through any process known to those skilled in the art. The composition need not include a single rare earth-containing compound but can include two or more insoluble rare earth-containing compounds. Such compounds can contain the same or different rare earth elements and can contain mixed valence or oxidation states. By way of example, when the insoluble rare earth-containing compound comprises a cerium oxide, the aggregate composition can comprise one or more cerium oxides such as $CeO_2$ (IV) and $Ce_2O_3$ (III).

In an embodiment where the insoluble rare earth-containing compound comprises a cerium-containing compound, the cerium-containing compound can be derived from precipitation of a cerium salt. In another embodiment, an insoluble cerium-containing compound can be derived from a cerium carbonate or a cerium oxalate. More specifically, a high surface area insoluble cerium-containing compound can be prepared by thermally decomposing a cerium carbonate or oxalate at a temperature between about 100° C. and about 350° C. in a furnace in the presence of air. The temperature and pressure conditions may be altered depending on the composition of the cerium containing starting material and the desired physical properties of the insoluble rare earth-containing compound. The reaction may be summarized as:

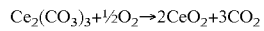

The product may be acid treated and washed to remove remaining carbonate. Thermal decomposition processes for producing cerium oxides having various features are described in U.S. Pat. No. 5,897,675 (specific surface areas), U.S. Pat. No. 5,994,260 (pores with uniform lamellar structure), U.S. Pat. No. 6,706,082 (specific particle size distribution), and U.S. Pat. No. 6,887,566 (spherical particles), and such descriptions are incorporated herein by reference. Cerium carbonate and materials containing cerium carbonate are commercially available and may be obtained from any source known to those skilled in the art.

In embodiments where the insoluble rare earth-containing compound comprises a cerium oxide, the insoluble rare earth-containing compound can include a cerium oxide such as $CeO_2$. In a particular embodiment, the aggregate composition can consists essentially of one or more cerium oxides, the polymer binder, and optionally, a flow aid.

The insoluble rare earth-containing compound can be present in the aggregate composition in the form of one or more of a granule, crystal, crystallite, particle or other particulate, referred to generally herein as a "particulate." The particulates of the insoluble rare earth-containing compounds can have a mean particle size of at least about 0.5 nm ranging up to about 1 μm or more. Specifically, such particulates can have a mean particle size of at least about 0.5 nm, more than about 1 nm, more particularly at least about 5 nm, and still more particularly at least about 10 nm. In other embodiments, the particulates can have mean particle sizes of at least about 100 nm, specifically at least about 250 nm, more specifically at least about 500 nm, and still more specifically at least about 1 μm.

To promote interaction of the insoluble-rare earth-containing compound with a contaminant in a solution or gas, the aggregate composition can comprise aggregated particulates of the insoluble rare earth-containing compound having a mean surface area of at least about 1 $m^2$/g. Depending upon the application, higher surface areas may be desired. Specifically, the particulates can have a surface area of at least about 5 $m^2$/g, in other cases more than about 10 $m^2$/g, and in still other cases more than about 25 $m^2$/g. Where higher surface areas are desired, the particulates can have a surface area of more than about 70 $m^2$/g, in other cases more than about 85 $m^2$/g, in still other cases more than 115 $m^2$/g, and in yet other cases more than about 160 $m^2$/g. In addition, it is envisioned that particulates with higher surface areas will be effective. One skilled in the art will recognize that in applications where the solution or gas flows through the composition, the surface area of the composition will impact the fluid dynamics of the fluid with the aggregate composition. As a result, one may need to balance benefits that are derived from increased surface areas with disadvantages such as pressure drop that may occur.

A polymer binder is included in the composition for forming an aggregate having desired size, structure, density, porosity and fluid properties. In some embodiments, the polymer binder can comprise one or more of fibers, particulates, aggregates of fibers and or particulates, and mixtures of the same. A suitable polymer binder can include any polymeric material that will bind and/or support the insoluble rare earth-containing compound under conditions of use. Suitable polymeric binders will include both naturally occurring and synthetic polymers, as well as synthetic modifications of such polymers. One skilled in the art will recognize that the selection of the polymer binder material will depend on such factors as the composition components, the properties of such components, their binding characteristics, the characteristics of the final composition and the intended method of use.

In general, polymers melting between about 50° C. and about 500° C., more particularly, between about 75° C. and about 350° C., even more particularly between about 80° C. and about 200° C., are suitable for use in aggregating the components of the composition. Non-limiting examples can include polyolefins that soften or melt in the range from about 85° C. to about 180° C., polyamides that soften or melt in the range from about 200° C. to about 300° C., and fluorinated polymers that soften or melt in the range from about 300° C. to about 400° C. The melting point of the polymer binder will preferably not exceed the sintering temperature of the selected insoluble rare earth-containing compound.

Such polymer materials will generally be included in the aggregate composition in amounts ranging from about 0 wt % to about 90 wt %, based upon the total weight of the composition. In some embodiments, the polymer binder will be present in an amount less than about 15% by weight of the composition. More specifically, the polymer binder may be less than about 10%, and in other embodiments, less than about 8% by weight of the composition.

Depending upon the desired properties of the composition, polymer binders can include one or more polymers generally categorized as thermosetting, thermoplastic, elastomer, or a combination thereof as well as cellulosic polymers and glasses. Suitable thermosetting polymers include, but are not limited to, polyurethanes, silicones, fluorosilicones, phenolic resins, melamine resins, melamine formaldehyde, and urea formaldehyde. Suitable thermoplastics can include, but are not limited to, nylons and other polyamides, polyethylenes, including LDPE, LLDPE, HDPE, and polyethylene copolymers with other polyolefins, polyvinylchlorides (both plasticized and unplasticized), fluorocarbon resins, such as polytetrafluoroethylene, polystyrenes, polypropylenes, cellulosic resins such as cellulose acetate butyrates, acrylic resins, such as polyacrylates and polymethylmethacrylates, thermoplastic blends or grafts such as acrylonitrile-butadiene-styrenes or acrylonitrile-styrenes, polycarbonates, polyvinylacetates, ethylene vinyl acetates, polyvinyl alcohols, polyoxymethylene, polyformaldehyde, polyacetals, polyesters, such as polyethylene terephthalate, polyether ether ketone, and phenol-formaldehyde resins, such as resols and novolacs. Suitable elasomers can include, but are not limited to, natural and/or synthetic rubbers, like styrene-butadiene rubbers, neoprenes, nitrile rubber, butyl rubber, silicones, polyurethanes, alkylated chlorosulfonated polyethylene, polyolefins, chlorosulfonated polyethylenes, perfluoroelastomers, polychloroprene (neoprene), ethylene-propylene-diene terpolymers, chlorinated polyethylene, fluoroelastomers, and ZALAK™ (Dupont-Dow elastomer). In a specific embodiment where the polymer binder comprises an ethylene vinyl copolymer, the insoluble rare earth-containing compound consists essentially of an anhydrous rare earth-containing compound. Those of skill in the art will realize that some of the thermoplastics listed above can also be thermosets depending upon the degree of cross-linking, and that some of each may be elastomers depending upon their mechanical properties. The categorization used above is for ease of understanding and should not be regarded as limiting or controlling.

Cellulosic polymers can include naturally occurring cellulose such as cotton, paper and wood and chemical modifications of cellulose. In a specific embodiment, the insoluble rare earth-containing compound can be mixed with paper fibers or incorporated directly into paper pulp for forming a paper-based filter comprising the insoluble rare earth-containing compound.

Polymer binders can also include glass materials such as glass fibers, beads and mats. Glass solids may be mixed with particulates of an insoluble rare earth-containing compound and heated until the solids begin to soften or become tacky so that the insoluble rare earth-containing compound adheres to the glass. Similarly, extruded or spun glass fibers may be coated with particles of the insoluble rare earth-containing compound while the glass is in a molten or partially molten state or with the use of adhesives. Alternatively, the glass composition may be doped with the insoluble rare earth-containing compound during manufacture. Techniques for depositing or adhering insoluble rare earth-containing compounds to a substrate material are described in U.S. Pat. No. 7,252,694 and other references concerning glass polishing. For example, electro-deposition techniques and the use of metal adhesives are described in U.S. Pat. No. 6,319,108 as being useful in the glass polishing art. The descriptions of such techniques are incorporated herein by reference.

In some applications, water-soluble glasses such as are described in U.S. Pat. Nos. 5,330,770, 6,143,318 and 6,881,766, may be an appropriate polymer binder. The descriptions of such glasses in the noted references are incorporated herein by reference. In other applications, materials that swell through fluid absorption including but not limited to polymers such as synthetically produced polyacrylic acids, and polyacrylamides and naturally-occurring organic polymers such as cellulose derivatives may also be used. Biodegradable polymers such as polyethylene glycols, polylactic acids, polyvinylalcohols, co-polylactideglycolides, and the like may also be used as the polymer binder.

Where it is desirable to regenerate the composition through sterilization, the selected polymer binder should be stable under sterilization conditions and should be otherwise compatible with the intended sterilization method. Specific non-limiting examples of polymer binders that are suitable for sterilization methods that involve exposure to high temperatures include cellulose nitrate, polyethersulfone, nylon, polypropylene, polytetrafluoroethylene, and mixed cellulose esters. Compositions prepared with these binders can be autoclaved when the prepared according to known standards. The aggregate composition can be stable to steam sterilization or autoclaving as well as to chemical sterilization through contact with oxidative or reductive chemical species, as a combination of sterilization methods may be required for efficient and effective regeneration. In an embodiment where sterilization includes the electrochemical generation of an oxidative or reductive chemical species, the electrical potential necessary to generate said species can be attained by using the composition as one of the electrodes. For example, a composition that contains a normally insulative polymer binder can be rendered conductive through the inclusion of a sufficiently high level of conductive particles such as granular activated carbon, carbon black, or metallic particles. Alternatively, if the desired level of carbon or other particles is not sufficiently high to render an otherwise insulative polymer conductive, an intrinsically conductive polymer may included in the binder material.

Optional components that are suitable for use in the aggregate composition can include one or more of soluble rare earth-containing compounds, decontamination agents, biocidal agents, adsorbents, flow aids, non-polymer binders and substrates, and the like. Such optional components may be included in the aggregate composition depending on the intended utility and/or the desired characteristics of the composition.

Optional soluble rare earth-containing compounds can have different activities and effects. By way of example, some soluble rare earth-containing compounds have been recognized as having a bacteriostatic or antimicrobial effect. Cerium chloride, cerium nitrate, anhydrous ceric sulfate, and lanthanum chloride are described as having such activity in "The Bacteriostatic Activity of Cerium, Lanthanum, and Thallium", Burkes et al., Journal of Bacteriology, 54:417-24 (1947). Similarly, the use of soluble cerium salts such as cerium nitrates, cerous acetates, cerous sulfates, cerous halides and their derivatives, and cerous oxalates are described for use in burn treatments in U.S. Pat. No. 4,088,754, such descriptions being incorporated herein by reference. Other soluble rare earth-containing compounds, whether organic or inorganic in nature, may impart other desirable properties to the compositions and may optionally be used.

Optional decontamination agents may include materials that are capable of removing or detoxifying chemical contaminants from various surfaces. Non-limiting examples of decontamination agents that may be suitable include transition metals and alkaline metals as described in U.S. Pat. No. 5,922,926, polyoxometallates as described in U.S. Patent Application Publication No. 2005/0159307 A1, aluminum oxides as described in U.S. Pat. Nos. 5,689,038 and 6,852,903, quaternary ammonium complexes as described in U.S. Pat. No. 5,859,064, zeolites as described in U.S. Pat. No. 6,537,382, and enzymes as described in U.S. Pat. No. 7,067,294. The descriptions of these decontamination agents in the noted references are incorporated herein by reference.

Biocidal agents can optionally be included for targeting biological contaminants in a solution or gas. Materials that may be suitable for use as biocidal agents include but are not limited to alkali metals, alkaline earth metals, transition metals, actinides, and derivatives and mixtures thereof. Specific non-limiting examples of secondary biocidal agents include elemental or compounds of silver, zinc, copper, iron, nickel, manganese, cobalt, chromium, calcium, magnesium, strontium, barium, boron, aluminum, gallium, thallium, silicon, germanium, tin, antimony, arsenic, lead, bismuth, scandium, titanium, vanadium, yttrium, zirconium, niobium, molybdenum, technetium, ruthenium, rhodium, palladium, cadmium, indium, hafnium, tantalum, tungsten, rhenium, osmium, iridium, platinum, gold, mercury, thallium, thorium, and the like. Derivatives of such agents can include acetates, ascorbates, benzoates, carbonates, carboxylates, citrates, halides, hydroxides, gluconates, lactates, nitrates, oxides, phosphates, propionates, salicylates, silicates, sulfates, sulfadiazines, and combinations thereof. When the aggregate composition optionally comprises a titanium-containing compound such as a titanium oxide, the weight ratio of the titanium-containing compound to the insoluble rare earth-containing compound is less than about 2:1. When the aggregate composition optionally comprises an aluminum-containing compound, the weight ratio of the aluminum-containing compound to the insoluble rare earth-containing compound is less than about 10:1. When one or more of the components of the aggregate composition is to be sintered, the composition will contain no more than two elements selected from the group consisting of yttrium, scandium, and europium. In an embodiment that includes an optional biocide agent selected from the group consisting of transition metals, transition metal oxides and transition metal salts, the aggregate composition will comprise less than about 0.01% by weight of a mixture of silver and copper metal nanoparticles.

Other materials that may be suitable for use as biocidal agents include organic agents such as quaternary ammonium salts as described in U.S. Pat. No. 6,780,332, and organosilicon compounds such as are described in U.S. Pat. No. 3,865,728. Other organic materials and their derivatives that are known to deactivate biological contaminants may also be used. By way of example, polyoxometalates are described in U.S. Pat. No. 6,723,349 as being effective at removing biological contaminants from fluids. This patent references M. T. in Heteropoly and Isopoly Oxometalales, Springer Verlag, 1983, and Chemical Reviews, vol. 98, No. 1, pp. 1-389, 1998, as describing examples of effective polyoxometalates. The descriptions of these organic biocidal agents in the noted references are incorporated herein by reference.

The aggregate composition may optionally comprise one or more flow aids. Flow aids are used in part to improve the fluid dynamics of a fluid over or through the aggregate composition, to prevent separation of components of the aggregate composition, prevent the settling of fines, and in some cases to hold the aggregate composition in place. Suitable flow aids can include both organic and inorganic materials. Inorganic flow aids can include ferric sulfate, ferric chloride, ferrous sulfate, aluminum sulfate, sodium aluminate, polyaluminum chloride, aluminum trichloride, silicas, diatomaceous earth and the like. Organic flow aids can include organic flocculents known in the art such as polyacrylamides (cationic, nonionic, and anionic), EPI-DMA's (epichlorohydrin-dimethylamines), DADMAC's (polydiallydimethylammonium chlorides), dicyandiamide/formaldehyde polymers, dicyandiamide/amine polymers, natural guar, etc. When present, the flow aid can be mixed with the insoluble rare earth-containing compound and polymer binder during the formation of the aggregate composition. Alternatively, particulates of the aggregate composition and of the flow aid can be mixed to yield a physical mixture with the flow aid dispersed uniformly throughout the mixture. In yet another alternative, the flow aid can be disposed in one or more distinct layers upstream and downstream of the aggregate composition. When present, flow aids are generally used in low concentrations of less than about 20%, in some cases less than 15%, in other cases less than 10%, and in still other cases less than about 8% by weight of the aggregate composition.

Other optional components can include various inorganic agents including ion-exchange materials such as synthetic ion exchange resins, activated carbons, zeolites (synthetic or naturally occurring), minerals and clays such as bentonite, smectite, kaolin, dolomite, montmorillinite and their derivatives, metal silicate materials and minerals such as of the phosphate and oxide classes. In particular, mineral compositions containing high concentrations of calcium phosphates, aluminum silicates, iron oxides and/or manganese oxides with lower concentrations of calcium carbonates and calcium sulfates are suitable. These materials may be calcined and processed by a number of methods to yield mixtures of varying compositions.

Other optional components of the aggregate composition include additives, such as particle surface modification additives, coupling agents, plasticizers, fillers, expanding agents, fibers, antistatic agents, initiators, suspending agents, photosensitizers, lubricants, wetting agents, surfactants, pigments, dyes, UV stabilizers, and suspending agents. The amounts of these materials are selected to provide the properties desired.

The aggregate composition can be used to remove, deactivate or detoxify chemical and biological contaminants in a solution or gas by contacting the fluid with the composition. Those familiar with the art of fluid treatment will understand that the components, physical dimensions and shape of the aggregate composition may be manipulated for different applications and that variations in these variables can alter flow rates, back-pressure, and the activity of the composition for treating certain contaminants. As a result, the size, form and shape of the aggregate composition can vary considerably depending on the intended method of use. In an embodiment where the aggregate composition is used to treat an aqueous solution containing arsenic, the aggregate composition can have an adsorption capacity for removing arsenic from the solution of at least about 50 mg of arsenic per gram of the aggregate composition. In some cases the adsorption capacity will be at least about 60 mg/g and in other cases at least about 70 mg/g. The adsorption capacity is believed to be in part dependent on the surface area of the insoluble rare earth-containing compound used to prepare the aggregate composition and of the resulting the aggregate composition.

The aggregate composition can be formed though one or more of mixing, extrusion, molding, heating, calcining, sintering, pressing, compaction, the use adhesives and/or other techniques known in the art. In embodiments where it is desired that the aggregate composition have higher surface areas, sintering is less desired. The use of the polymer binder enables the production of an aggregate composition of sufficient size, structure and durability for use in the treatment of solutions and gases. The combination of the polymer binder and the insoluble rare earth-containing compound produces an aggregate composition that has elevated activity for decontaminating fluids without imposing a substantial pressure drop on the treated fluid.

The aggregate composition can comprise a flowable particulate, granule, bead, pellet, powder, fiber, or similar form. Such particulates can have a mean particle size of at least about 1 µm, specifically at least about 5 µm, more specifically at least about 10 µm, and still more specifically at least about 25 µm. In other embodiments, the aggregate will have a mean particle size of at least about 0.1 mm, specifically at least about 0.5 mm, more specifically at least about 1 mm, still more specifically at least about 2 mm, and yet still more specifically more than 5.0 mm. The aggregate composition can be crushed, cut, chopped or milled and then sieved to obtain a desired particle size. Such flowable particulates can be used in fixed or fluidized beds or reactors, stirred reactors or tanks, distributed in particulate filters, encapsulated or enclosed within membranes, mesh, screens, filters or other fluid permeable, structures, deposited on filter substrates, and may further be formed into a desired shape such as a sheet, film, mat or monolith for various applications.

In addition, the aggregate composition can be incorporated into or coated onto a filter substrate. Filter substrates can include polymer and non-polymer binder materials as described herein and materials such as ceramics, metals, carbons, and the like. Filler substrates can be made from particulates, fibers, sheets, films and combinations of the same. The structure of a filter substrate will vary depending upon the application but can include any fluid permeable structure having a desired shape and physical dimensions suitable for the conditions of use. Non-limiting examples include mesh, screens, films, sheets, tubes, honeycombed structures, monoliths and blocks of various shapes including cylinders and toroids.

In another embodiment, the invention provides a process for making an aggregate composition for treating a fluid containing one or more contaminants. The process includes the step of mixing an insoluble rare earth-containing compound with a polymer binder to form a mixture. The insoluble rare earth-containing compound and polymer binder materials have been described in detail above. In a more specific embodiment, the insoluble rare earth-containing compound comprises a high surface area particulate of an insoluble cerium-containing compound, more particularly, the product of a calcined cerium carbonate. Specific examples of the polymer binders that may be mixed with the insoluble rare earth-containing compound include polyolefins, cellulose acetate, acrylonitrile-butadiene-styrene, PTFE, paper fibers, glass fibers or beads, and adhesive polymers. The polymer binder should be selected so as not to have a melting point that exceeds the sintering temperature of the selected insoluble rare earth-containing compound, as sintering of the insoluble rare earth-containing compound can reduce the surface area of the final aggregate composition.

Techniques and equipment known in the art for mixing particulates and fibers can be used to mix the components. The components are subjected to mixing for a period of time sufficient to yield a relatively homogeneous mixture. Moreover, to ensure a more uniform distribution of the insoluble rare earth-containing compound throughout the aggregate composition, in embodiments where the mixture is to be subjected to a heat treatment, it is preferred that the components be thoroughly mixed prior to heating.

The mixture is subjected to one or more of a mechanical, chemical and thermal treatment to adhere the insoluble rare earth-containing compound to the polymer binder. Mechanical treatments can include compacting, compressing, pressing, mixing, extruding and subjecting the mixture to vibration or waves. Compression of the mixture can occur prior, during or after the mixture is heated depending on the desired properties of the aggregate composition. The mixture can be compressed in a press, test cylinder, extruder or other equipment known in the art for compressing or compacting materials into a desired shape or form. The amount of pressure and the duration that such pressure is applied will depend on the selected components, their binding characteristics and the intended use of the aggregate composition. Within limits, the application of higher pressures and/or the application of pressure for longer periods of time are intended to prevent the aggregate composition from degrading or producing fines under conditions of use. Chemical treatments can include one or more of chemical conversion and use of chemical adhesive(s) such as are known in the art. By way of example, a cross linker may be used to promote cross linking of the polymer binder. Thermal treatments can include heating the mixture to an elevated temperature to promote a chemical and/or physical conversion.

In one embodiment, the mixture is heated to a temperature below the melting point of the polymer binder at which the polymer binder softens and becomes malleable or tacky to the touch. The mixture should be heated to a temperature sufficient to ensure that the insoluble rare earth-containing compound will adhere to the polymer binder without fully melting the polymer binder. The specific temperature will depend on the composition of the selected polymer binder. The mixture is then allowed to cool to form an aggregate composition.

In some embodiments, the polymer binder comprises one or more of fibers, particulates, aggregates of fibers or particulates, and mixtures of the same, and the insoluble rare earth-containing compound is adhered to the outer surface of the polymer binder upon treatment of the mixture. Where the insoluble rare earth-containing compound is in the form of a particulate, the aggregate composition product can comprise a matrix of insoluble rare earth-containing particulates adhered to or embedded in the outer surface of the polymer binder.

An optional step can include reducing the size of the aggregate composition. Size reduction can be achieved by techniques known in the art, including one or more of cutting, crushing, milling, and sieving the aggregate composition down to the desired size.

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

Particulate Polymer Binder

In this example, aggregates were prepared with Microthene® F (FN50100), a low density polyethylene obtained from Equistar. Microthene® F is an ultra-fine and spherical shaped powder with an average 20 micron particle size, a melt index of 23 g/10 min, and a melting range of 92.0° C.-114.5° C. The cerium oxide ($CeO_2$) was obtained from HEFA Rare Earth Canada Company, Ltd.

Physical mixtures were made of the cerium oxide and the polymer in differing compositions (by weight). Each component was weighed and mixed with a laboratory mixer fitted with a paddle attachment set to rotate at ≈160 rpm for approximately 30 minutes to achieve a homogeneous mixture. A Carver test cylinder with an internal diameter of 1.125 inches was heated to temperatures varying from 90° C. to 100° C. Four grams of the ceria/polymer mixture were poured in to the warmed die and pressed to pressures ranging from 3400 psig to 10000 psig. Pressing times varied from 5 to 20 minutes. After the pellets were pressed, they were cut and sieved between an 18×70 mesh to obtain particles on the order of 500 µm. Specific surface areas were measured on a Micromeritics FlowsorbII 2300 single point BET instrument using the manufacturer's prescribed method.

Table 1 details the parameter set.

TABLE 1

| Temperature (° C.) | Pressure (psig) | Time (min) | % Binder | SSA ($m^2/g$) |
|---|---|---|---|---|
| 90 | 3400 | 5 | 2.5 | 107.74 |
| 90 | 10000 | 20 | 2.5 | 88.11 |
| 90 | 3400 | 20 | 10 | 79.01 |
| 95 | 6800 | 12.5 | 6.25 | 107.08 |
| 100 | 3400 | 5 | 10 | — |
| 100 | 10000 | 5 | 2.5 | 102.45 |
| 100 | 3400 | 20 | 2.5 | 92.72 |
| 100 | 10000 | 20 | 10 | 38.67 |

EXAMPLE 2

Particulate Polymer Binder

In this example set, aggregates were formed with Polifil® RP ABS (acrylonitrile butadiene styrene) terpolymer obtained from The Plastics Group of America. The thermoplastic resin has a melt flow of 4-8 g/10 min and a vicat softening point of 98.9° C.

The ABS was sieved to yield particles that were less than 100 microns, then mixed with cerium oxides, pressed, and sieved following the same procedure from Example 1. The temperature range of the test cylinder was increased to 105° C. to 110° C. All other parameters remained the same. The 4 g pellets were then cut and sieved between an 18×70 mesh to yield an average particle size of 500 µm. Specific Surface Areas were determined as in Example 1.

Arsenic capacity was determined by challenging 10 mg of the prepared aggregate against 500 ml of a 400 ppb arsenic solution. The solution was prepared in NSF water and the pH was adjusted to 7.5. The 500 ml of solution and 10 mg of material were both put in a wide mouth plastic bottle and allowed to tumble for 24 hours. After the 24 hours, the aggregate was filtered and analyzed for arsenic concentration using Agilent's ICP-MS (Inductively coupled plasma mass spectrometer) Model number 7500CE. For each composition, three samples were prepared, tested and analyzed. The reported As Capacity data represents an average of the three samples for each composition.

Table 2 details the parameter set.

TABLE 2

| Temperature (° C.) | Pressure (psig) | Time (min) | % Binder | SSA ($m^2/g$) | As(V) Capacity (mg As/g material) |
|---|---|---|---|---|---|
| 105 | 10000 | 5 | 10 | 91.68 | 1.33 |
| 107.5 | 6800 | 12.5 | 6.25 | 87.46 | 1.28 |
| 105 | 3400 | 5 | 2.5 | 115.54 | 4.38 |
| 105 | 10000 | 20 | 2.5 | 112.27 | |
| 110 | 3400 | 5 | 10 | 88.4 | 3.41 |
| 105 | 3400 | 20 | 10 | 114.86 | 2.95 |
| 110 | 10000 | 5 | 2.5 | 78.42 | 2.15 |
| 110 | 3400 | 20 | 2.5 | 89.48 | 4.11 |
| 110 | 10000 | 20 | 10 | 115.41 | 3.24 |

EXAMPLE 3

Particulate Polymer Binder with Diatomaceous Earth

In this example, the parameter set from Example 2 was altered only with the addition of diatomaceous earth (DE). The composition of the DE ranged between 1% and 5% (by weight) and all other parameters and procedures remained the same. The 4 g pellets were then cut and sieved between an 18×70 mesh to yield an average particle size of 500 µm. Specific Surface Areas were determined as in the previous Examples.

Table 3 details the parameter set.

TABLE 3

| Temperature ° C. | Pressure (psig) | % Binder | % DE | SSA ($m^2/g$) |
|---|---|---|---|---|
| 110 | 3400 | 2.5 | 5 | 91 |
| 105 | 10000 | 2.5 | 5 | 75 |
| 105 | 3400 | 2.5 | 1 | 71 |
| 107.5 | 6800 | 6.25 | 3 | 72 |
| 110 | 3400 | 10 | 1 | 88 |
| 110 | 10000 | 2.5 | 1 | 73 |
| 105 | 10000 | 10 | 1 | 83 |
| 110 | 10000 | 10 | 5 | 64 |
| 105 | 3400 | 10 | 5 | 70 |
| 107.5 | 6800 | 6.25 | 3 | 83 |

EXAMPLE 4

The procedure from the Examples 1-3 was repeated with the cerium oxide and GUR® 2122, an ultra high molecular weight polyethylene obtained from Ticona. The linear polyolefin has a molecular weight of 4.5 MM g/mol, a vicat softening point of 80° C., and particle size on the order of 100 µm.

The temperature of the test cylinder was varied between 60° C. and 10° C., the pressing pressure between 3400 psig and 10,000 psig, and the pressing time between 0.5 to 5 minutes. The 4 g pellets were cut and sieved between an 1.8×70 mesh to yield an average particle size of 500 µm. Specific Surface Areas were determined as in the previous Examples.

Table 4 lists the parameter matrix for this particular example.

TABLE 4

| Temperature (° C.) | Pressure (psig) | Time (min) | % Binder | SSA ($m^2/g$) |
|---|---|---|---|---|
| 80 | 6800 | 2.75 | 6 | 82.13 |
| 100 | 10000 | 5 | 10 | 84.02 |
| 60 | 10000 | 0.5 | 10 | |
| 60 | 3400 | 0.5 | 2 | |
| 100 | 3400 | 5 | 2 | 118.01 |
| 100 | 3400 | 0.5 | 10 | 87.28 |
| 80 | 6800 | 2.75 | 6 | 90.26 |
| 60 | 3400 | 5 | 10 | |
| 60 | 10000 | 5 | 2 | |
| 100 | 10000 | 0.5 | 2 | |

EXAMPLE 5

Fibrous Polymer Binder

In this example, aggregates were produced using Short Stuff® Polyethylene pulp obtained from Mini Fibers, Inc. These fibers are a high density fibrillated polyethylene, a thermoplastic with a melting range of 125° C.-136° C., a length of 0.1 mm-0.6 mm and a diameter of 5 μm. The cerium oxide is the same as with the previous examples.

Each component was weighed and mixed with a laboratory mixer fitted with a blade attachment set to rotate at ≈60 rpm for approximately 30 minutes to achieve a homogeneous mixture. The Carver test cylinder with an internal diameter of 1.125 inches was heated to temperatures varying from 70° C. to 115° C. Four grams of the ceria/polymer mixture were poured in to the warmed die and pressed to pressures ranging from 3400 psig to 10,000 psig. Pressing times also varied at this point from 30 to 120 seconds. The 4 g pellets were cut and sieved between an 18×35 mesh to yield minimum particle size of 500 μm. Specific Surface Areas and As Capacity were determined as in Example 2.

Table 5 details the parameter set.

TABLE 5

| Temperature (° C.) | Pressure (psig) | Time (sec) | % Binder | SSA ($m^2/g$) | As(III) Capacity (mg As/g material) | As(V) Capacity (mg As/g material) |
|---|---|---|---|---|---|---|
| 115 | 10000 | 120 | 7 | 81.8 | 6.22 | 1.26 |
| 115 | 3400 | 120 | 2 | 105.86 | 7.51 | 3.13 |
| 92.5 | 6800 | 75 | 4.5 | 74.91 | 5.72 | 1.62 |
| 70 | 10000 | 120 | 2 | 93.17 | 5.21 | 1.77 |
| 70 | 3400 | 120 | 7 | 90.19 | 7.41 | 2.07 |
| 115 | 10000 | 30 | 2 | 105.86 | 5.88 | 1.05 |
| 115 | 3400 | 30 | 7 | 144.81 | 5.43 | 1.07 |
| 70 | 10000 | 30 | 7 | 82.77 | 5.2 | 2.16 |
| 70 | 3400 | 30 | 2 | 102.85 | 5.72 | 2.82 |
| 92.5 | 6800 | 75 | 4.5 | 84.59 | 7.02 | 3.39 |

EXAMPLE 6

Fibrous Polymer Binder with Diatomaceous Earth

The aggregates in this example were prepared with the same material and procedure as in Example 5 with the addition of diatomaceous earth (DE). The composition of the DE ranged between 1% and 5% (by weight), the composition of the binder ranged from 2%-5% (by weight), and the temperature of the Carver test cylinder ranged from 70° C. to 115° C. The pressing pressure and time was held constant at 6800 psig for 1 minute. The 4 g pellets were cut and sieved between an 18×35 mesh to yield minimum particle size of 500 μm. Specific Surface Areas and As Capacity were determined as in Example 2.

Table 6 details the parameter set.

TABLE 6

| Temperature (° C.) | % Binder | % DE | SSA ($m^2/g$) | As(III) Capacity (mg As/g material) | As(V) Capacity (mg As/g material) |
|---|---|---|---|---|---|
| 70 | 5 | 5 | 61.2 | 5.41 | 4.22 |
| 115 | 5 | 1 | 80.85 | 5.39 | 3.58 |
| 115 | 2 | 5 | 89.81 | 6.20 | 3.94 |
| 92.5 | 3.5 | 3 | 91.61 | 7.54 | 3.73 |
| 70 | 5 | 1 | 101.64 | 5.53 | 4.11 |
| 115 | 2 | 1 | 94.62 | 5.66 | 3.28 |
| 70 | 2 | 1 | 83.76 | 7.23 | 3.59 |
| 70 | 2 | 5 | 100.72 | 7.86 | 2.98 |
| 92.5 | 3.5 | 3 | 65.11 | 5.81 | 3.49 |
| 115 | 5 | 5 | 58.32 | 7.56 | 3.08 |

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An aggregate composition for treating a fluid containing one or more contaminants, the composition comprising:
   an insoluble rare earth-containing compound comprising cerium oxide, wherein the insoluble rare earth-containing compound is adhered to a polymer binder, wherein the aggregate composition is in the form of one of a flowable particulate, granule, bead, pellet, powder, or fiber, and wherein the composition has:
   i) less than about 15 wt% of the polymer binder; and
   ii) at least about 75 wt% of the insoluble rare earth-containing compound.

2. The aggregate composition of claim 1, wherein the polymer binder is less than about 8% by weight of the aggregate composition.

3. The aggregate composition of claim 1, wherein the polymer binder comprises one or more polymers selected from the group consisting of thermosetting polymers, thermoplastic polymers, elastomeric polymers, cellulosic polymers, and glasses.

4. The aggregate composition of claim 1, wherein the insoluble rare earth-containing compound comprises particulates adhered to an outer surface of the polymer binder and wherein the insoluble rare earth-containing composition is derived by thermal decomposition.

5. The aggregate composition of claim 1, wherein the insoluble rare earth-containing compound further comprises one or both of lanthanum, and praseodymium.

6. The aggregate composition of claim 1, wherein the insoluble rare earth-containing compound comprises cerium oxide in the form of an anhydrous, insoluble rare earth-containing compound.

7. The aggregate composition of claim 1, wherein the insoluble rare earth-containing compound comprises particulates having a mean surface area of at least about 5 $m^2/g$, and wherein the insoluble rare earth-containing compound comprises particulates having a mean particle size of at least about 250 nm.

8. The aggregate composition of claim 1, wherein the insoluble rare earth-containing compound comprises particulates having a mean particle size of at least about 100 nm and wherein the polymer binder is less than about 10% by weight of the composition.

9. The aggregate composition of claim 1, wherein the aggregate composition comprises aggregated particulates having a mean particle size of at least about 0.1 mm.

10. The aggregate composition of claim 1, wherein the aggregate composition has an adsorption capacity for removing arsenic from an aqueous solution of at least about 50 mg of arsenic per gram of the aggregate composition, wherein the aggregate composition comprises aggregated particles having a mean particle size of at least about 0.5 mm and wherein the aggregate composition has a mean surface area of at least about 25 m$^2$/g.

11. The aggregate composition of claim 1, wherein the insoluble rare earth-containing compound comprises two or more insoluble rare earth-containing compounds.

12. The aggregate composition of claim 11, wherein the two or more insoluble rare earth-containing compounds have one or both of differing valence and oxidation states.

13. The aggregate composition of claim 1, wherein the aggregate composition comprises more than about 95% by weight of the insoluble rare earth-containing compound.

14. A composition for treating a fluid containing one or more contaminants, the composition comprises:
an aggregate having more than 10.01 wt% of an insoluble rare earth-containing compound comprising cerium oxide derived by thermal decomposition; and
a polymeric binder, wherein the insoluble rare earth-containing compound is adhered to the polymeric binder, and wherein the aggregate is in the form of one of a flowable particulate, granule, bead, pellet, powder or fiber.

15. The composition of claim 14, wherein the polymer binder is less than about 8% by weight of the aggregate, wherein the polymer binder comprises one or more polymers selected from the group consisting of thermosetting polymers, thermoplastic polymers, elastomeric polymers, cellulosic polymers, and glasses, and wherein the insoluble rare earth-containing compound comprises particulates adhered to an outer surface of the polymer binder.

16. The composition of claim 14, wherein the insoluble rare earth-containing compound comprises one or both of lanthanum and praseodymium.

17. The composition of claim 14, wherein the insoluble rare earth-containing compound comprises an anhydrous, insoluble rare earth-containing compound.

18. The composition of claim 14, wherein the aggregate further includes a soluble rare earth-containing composition.

19. The composition of claim 14, wherein the aggregate has a mean particle size of at least about 0.1 mm.

20. The composition of claim 14, wherein the aggregate comprises more than about 95% by weight of the insoluble rare earth-containing compound.

21. The composition of claim 14, wherein the insoluble rare earth-containing compound comprises particulates having a mean particle size of at least about 100 nm and wherein the insoluble rare earth-containing compound comprises particulate have a mean surface area of at least about 25 m$^2$/g.

22. An aggregate composition for treating a fluid containing one or more contaminants, the aggregate composition comprising:
a polymer binder comprising less than 15% by weight of the aggregate composition;
one or more optional soluble rare earth-containing compounds; and
an insoluble rare earth-containing compound.

23. The aggregate composition of claim 22, wherein the polymer binder is less than about 10% by weight of the aggregate composition.

24. The aggregate composition of claim 22, wherein the polymer binder comprises one or more polymers selected from the group consisting of polyurethanes, silicones, fluorosilicones, phenolic resins, melamine resins, melamine formaldehyde, urea formaldehyde, nylons and other polyamides, polyethylenes, LDPE, LLDPE, HDPE, polyethylene copolymers, polyolefins, plasticized polyvinylchlorides, unplasticized polyvinylchlorides, fluorocarbon resins, polytetrafluoroethylene, polystyrenes, polypropylenes, cellulosic resins, cellulose acetate butyrates, acrylic resins, polyacrylates, polymethylmethacrylates, thermoplastic blends, thermoplastic grafts, acrylonitrile-butadiene-styrenes, acrylonitrile-styrenes, polycarbonates, polyvinylacetates, ethylene vinyl acetates, polyvinyl alcohols, polyoxymethylene, polyformaldehyde, polyacetals, polyesters, polyethylene terephthalate, polyether ether ketone, phenol-formaldehyde resins, resols, novolacs, elasomers, natural rubbers, synthetic rubbers, styrene-butadiene rubbers, neoprenes, nitrile rubber, butyl rubber, silicones, alkylated chlorosulfonated polyethylene, chlorosulfonated polyethylenes, perfluoroelastomers, polychloroprene, ethylene-propylene-diene terpolymers, chlorinated polyethylene, and fluoroelastomers, wherein the polymer binder is less than about 8% by weight of the aggregate composition.

25. The aggregate composition of claim 22, wherein the insoluble rare earth-containing compound comprises one or more of cerium, lanthanum, or praseodymium, and wherein the insoluble rare earth-containing compound has a mean particle size of at least about 250 nm.

26. The aggregate composition of claim 22, wherein the insoluble rare earth-containing compound comprises cerium oxide has a mean particle size of at least about 500 nm 27. The aggregate composition of claim 22, further comprising one or more flow aids.

28. The aggregate composition of claim 27, wherein the flow aid is selected from the group consisting of inorganic flow aids, ferric sulfate, ferric chloride, ferrous sulfate, aluminum sulfate, sodium aluminate, polyaluminum chloride, aluminum trichloride, silicas, diatomaceous earth, organic flow aids, organic flocculents, cationic polyacrylamides, nonionic polyacrylamides, anionic polyacrylamides, EPI-DMA's, epichlorohydrin-dimethylamines, DADMAC's, polydiallydimethyl-ammonium chlorides, dicyandiamide/formaldehyde polymers, dicyandiamide/amine polymers, and natural guar.

29. The aggregate composition of claim 22, wherein the aggregate composition consists essentially of one or more cerium oxides, wherein the aggregate composition is in the form of a flowable particulate, granule, bead, pellet, powder, fiber or similar form, wherein the aggregate composition has a mean particle size of at least about 0.1 mm, and wherein the aggregate composition has a mean surface area of at least about 25 m$^2$/g.

30. The aggregate composition of claim 22, wherein the insoluble rare earth-containing compound is in the form of one or more of a granule, crystallite, particle or other particulate.

31. The aggregated composition of claim 22, wherein the insoluble rare earth-containing compound includes one or more of lanthanum, cerium, praseodymium, neodymium, promethium, samarium, europium, gadolinium, terbium, dysprosium, holmium erbium, thulium, ytterbium and lutetium and wherein the aggregated composition comprises more than 95% by weight of the insoluble rare earth-containing compound.

32. The aggregated composition of claim 22, wherein the insoluble rare earth-containing compound comprises two or more insoluble rare-earth containing compounds, wherein the two or more insoluble rare earth-containing compound comprises one or more of cerium, lanthanum and praseodymium, wherein the two or more insoluble rare earth-containing compounds comprise the same or different rare earth elements, wherein the same or different rare earth elements have at least one of mixed valence or oxidation states, wherein the aggregate composition has a mean particle size of at least about 0.5 mm, and wherein the aggregate composition has a mean surface area of at least about 70 m²/g.

33. The aggregate composition of claim 22, wherein the insoluble rare earth-containing compound comprises one or more cerium oxides and wherein the one or more soluble rare earth-containing compounds comprise a cerous, ceric or lanthanum-containing compound.

34. The aggregate composition of claim 33, wherein the one or more cerium oxide comprises cerium (IV) oxide (CeO₂) and wherein the one or more soluble rare earth-containing compounds is selected from the group consisting of cerium chlorides, cerium nitrates, anhydrous ceric sulfates, lanthanum chlorides, cerous acetates, cerous sulfates, cerous halides, and cerous oxalates.

35. The aggregate composition of claim 22, further including one or both of an inorganic agent and an additive, wherein the inorganic agent is selected from the group consisting of synthetic ion exchange resins, activated carbons, synthetic zeolites, naturally occurring zeolites, minerals, clays, bentonite clays, smectite clays, kaolin clays, dolomite clays, montmorillinite clays, clay derivatives, metal silicate materials, metal silicate minerals, metal phosphates, mineral phosphates, metal oxides, calcium phosphates, aluminum silicates, iron oxides, manganese oxides, and wherein the additive is selected from the group consisting of particle surface modification additives, coupling agents, plasticizers, fillers, expanding agents, fibers, antistatic agents, initiators, suspending agents, photosensitizers, lubricants, wetting agents, surfactants, pigments, dyes, UV stabilizers, and suspending agents.

36. The aggregate composition of claim 22, wherein the binder has a melting temperature, wherein the insoluble rare earth-compound has a sintering temperature and wherein the melting temperature of the polymer does not exceed the sintering temperature of the insoluble rare earth-compound.

37. The aggregate composition of claim 22, wherein the insoluble rare earth-containing compound comprises a matrix of insoluble rare earth-containing particulates adhered to an outer surface of the polymer binder, and wherein the insoluble rare earth-containing compound comprises a matrix of insoluble rare earth-containing particulates embedded in an outer surface of the polymer binder.

38. The aggregate composition of claim 1, wherein the aggregate composition further includes a soluble rare earth-containing composition.

39. The aggregate composition of claim 1, wherein the aggregate composition comprises two or more insoluble rare earth-containing compounds and at least one soluble rare earth-containing compound.

40. The composition of claim 14, wherein the aggregate composition further includes a soluble rare earth-containing composition.

41. The composition of claim 14, wherein the aggregate composition comprises two or more insoluble rare earth-containing compounds and at least one soluble rare earth-containing compound.

42. The composition of claim 14, wherein the insoluble rare earth-containing compound further comprises one or both of lanthanum, and praseodymium.

43. The aggregate composition of claim 22, wherein the insoluble rare earth-containing compound comprises cerium oxide.

44. The aggregate composition of claim 22, wherein the insoluble rare earth-containing compound is an anhydrous, insoluble rare earth-containing compound.

45. The aggregate composition of claim 1, wherein the cerium oxide comprises cerium (IV) oxide.

46. The aggregate composition of claim 1, wherein the cerium oxide comprises cerium (IV) and cerium (III) oxides.

47. The aggregate composition of claim 14, wherein the cerium oxide comprises cerium (IV) oxide.

48. The aggregate composition of claim 14, wherein the cerium oxide comprises cerium (IV) and cerium (III) oxides.

49. The aggregate composition of claim 22, wherein the insoluble rare earth-containing compound comprises cerium (IV) oxide.

50. The aggregate composition of claim 22, wherein the insoluble rare earth-containing compound comprises cerium (IV) and cerium (III) oxides.

* * * * *